(12) United States Patent
Simon

(10) Patent No.: US 7,104,221 B2
(45) Date of Patent: Sep. 12, 2006

(54) COLLAPSIBLE DOGHOUSE

(75) Inventor: Allen Simon, New York, NY (US)

(73) Assignee: Four Paws Products, Ltd., Hauppauge, NY (US)

( * ) Notice: Subject to any disclaimer, the term of this patent is extended or adjusted under 35 U.S.C. 154(b) by 0 days.

(21) Appl. No.: 10/853,730

(22) Filed: May 24, 2004

(65) Prior Publication Data

US 2005/0257750 A1   Nov. 24, 2005

(51) Int. Cl.
*A01K 1/03* (2006.01)

(52) U.S. Cl. .................. 119/498; 119/499; 119/482; 446/478; 52/79.5

(58) Field of Classification Search ........... 119/499, 119/498, 416, 431, 472, 473, 482, 491, 492, 119/513, 514, 432, 452, 461, 504, 165, 168, 119/436, 428; 446/476, 478, 106–116, 901, 446/487; D30/108–112; 52/66, 79.5, 79.9; 403/252, 381, 331, 354; 217/62

See application file for complete search history.

(56) References Cited

U.S. PATENT DOCUMENTS

| | | | |
|---|---|---|---|
| 952,355 A * | 3/1910 | Whittier | 119/492 |
| 954,676 A * | 4/1910 | Horton et al. | 217/62 |
| 982,703 A * | 1/1911 | Brainard | 119/491 |
| 1,050,855 A * | 1/1913 | Schnebly et al. | 119/491 |
| 1,455,105 A * | 5/1923 | Butcher | 119/491 |
| 2,092,155 A * | 9/1937 | Hackett | 119/498 |
| 2,347,049 A * | 4/1944 | Green | 52/584.1 |
| 2,410,221 A | 10/1946 | Latura | |
| 2,445,055 A | 7/1948 | Capaul | |
| 2,954,007 A | 9/1960 | Mitchell | |
| 3,020,601 A * | 2/1962 | Stambaugh et al. | 52/262 |
| 3,116,847 A | 1/1964 | Collins | |
| 3,256,860 A | 6/1966 | Parker | |
| 3,280,796 A | 10/1966 | Hatcher | |
| 3,410,474 A | 11/1968 | Keil | |
| 3,547,472 A | 12/1970 | Ehrman | |
| 3,866,577 A | 2/1975 | Mathis | |
| 4,006,713 A | 2/1977 | Hawley, III | |
| 4,021,960 A * | 5/1977 | Walmer | 446/104 |
| 4,109,427 A | 8/1978 | O'Briane et al. | |
| 4,148,106 A * | 4/1979 | Gallien | 5/296 |
| 5,115,762 A * | 5/1992 | Long | 119/499 |
| 5,121,710 A | 6/1992 | Gonzalez | |

(Continued)

FOREIGN PATENT DOCUMENTS

DE    3236474 A  * 10/1982

*Primary Examiner*—Andrea Valenti
(74) *Attorney, Agent, or Firm*—Darby & Darby

(57) ABSTRACT

A doghouse includes a plurality of side panels connecting a front panel and a rear panel. A roof includes two roof panels each including runners that slidably connect to upper ledges in the front and rear panels. The side panels can be connected to the front and rear panels using hooks on the side panels that are slidably engaged to receiving members in slots in the front and rear panels. Alternatively, the side panels can slidably connect to the front and rear panels using a tee or dovetail joint. The prefabricated doghouse can be disassembled and reassembled multiple times over the lifetime of the doghouse without experiencing significant wear and tear. The doghouse can be assembled and disassembled efficiently by following a series of easy-to-follow steps. A user can disassemble the doghouse, store the doghouse, and easily assemble the doghouse with a minimal amount of time and effort.

21 Claims, 19 Drawing Sheets

U.S. PATENT DOCUMENTS

| | | |
|---|---|---|
| 5,400,743 A | 3/1995 | Buckley |
| 5,657,583 A | 8/1997 | Tennant |
| 5,752,470 A | 5/1998 | Koneke |
| 5,899,251 A | 5/1999 | Turner |
| 5,950,568 A | 9/1999 | Axelrod et al. |
| 6,349,435 B1 * | 2/2002 | Mitchell ........................ 5/296 |
| 6,460,485 B1 * | 10/2002 | Burg ........................... 119/431 |
| 6,520,831 B1 * | 2/2003 | Craig ........................... 446/476 |
| 6,763,784 B1 * | 7/2004 | Liu .............................. 119/452 |
| 6,843,025 B1 * | 1/2005 | Paz ............................. 52/79.1 |
| 2003/0024483 A1 * | 2/2003 | Pederson .................... 119/513 |

* cited by examiner

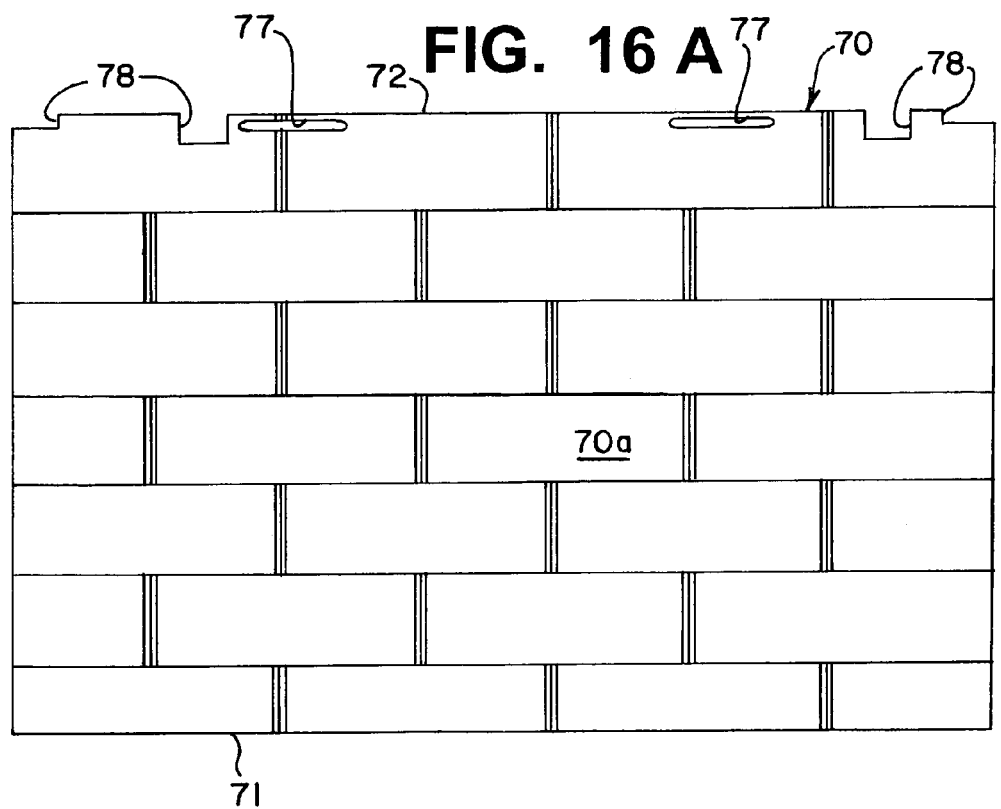
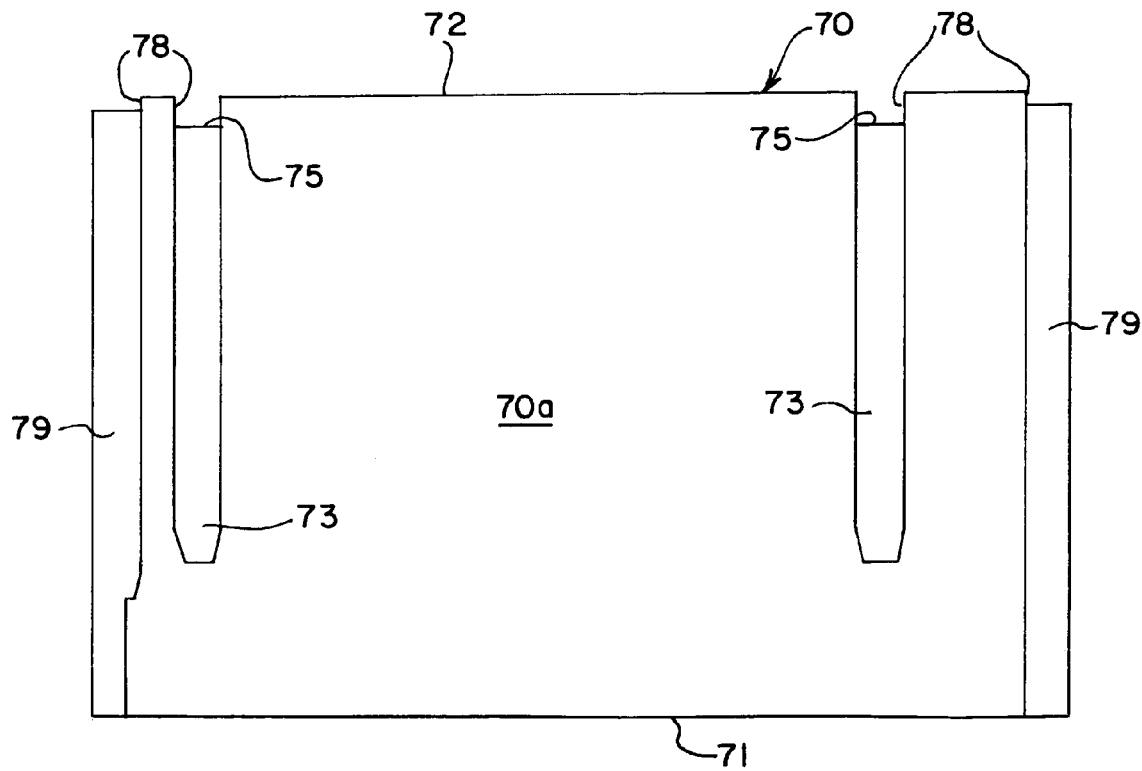

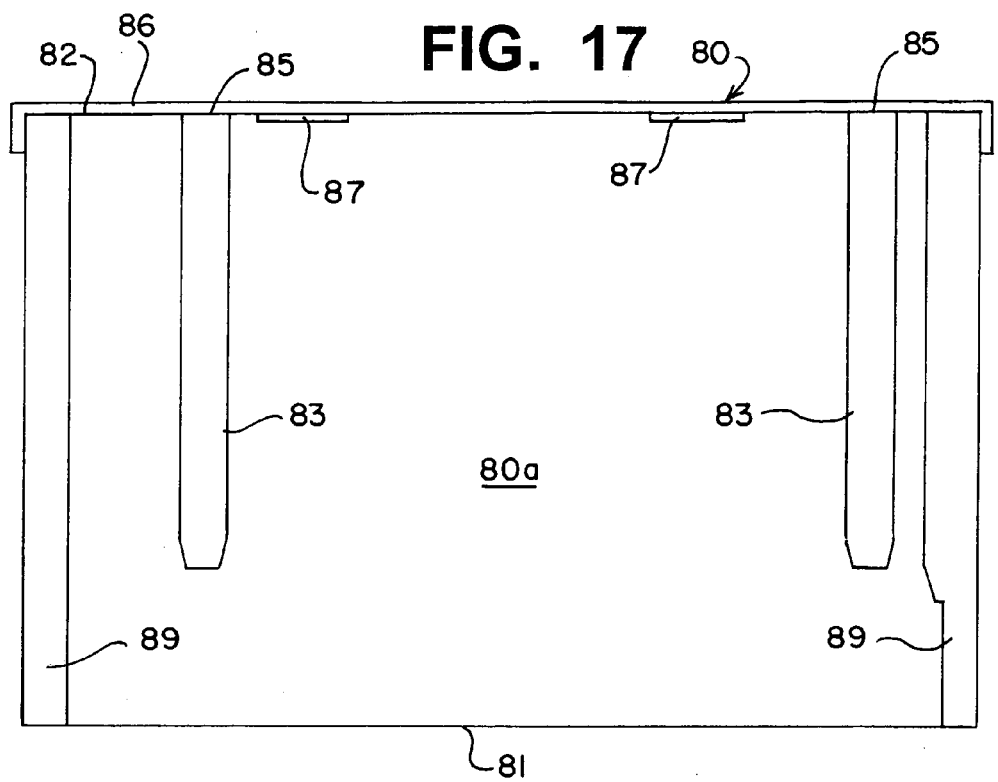
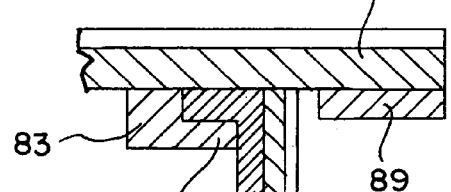
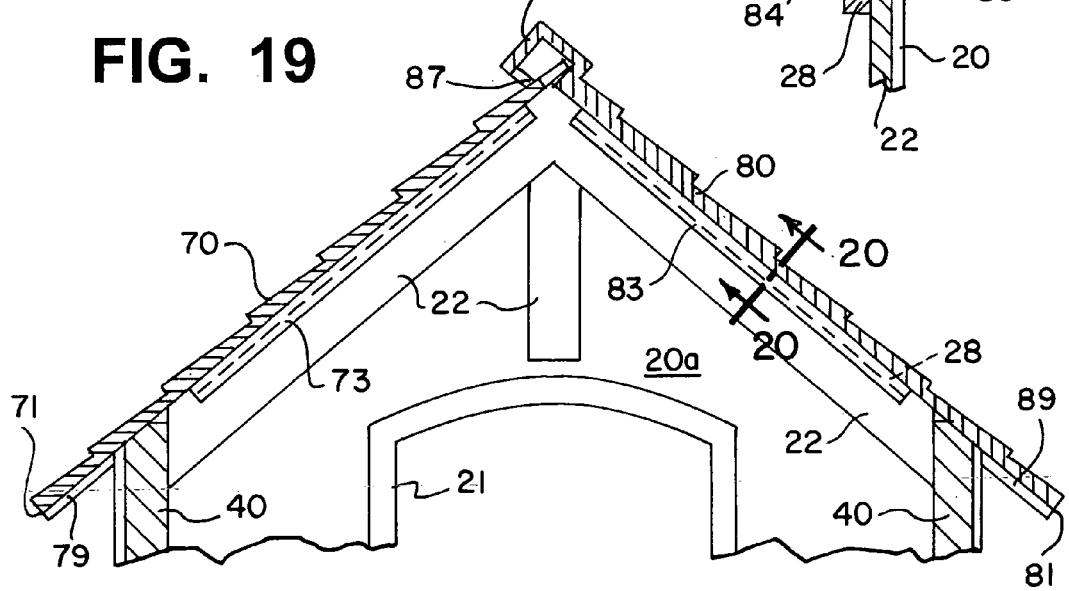

COLLAPSIBLE DOGHOUSE

TECHNICAL FIELD

The present invention relates to a house for a dog or other animal and more particularly, relates to a collapsible doghouse that can be disassembled and reassembled multiple times.

BACKGROUND

Conventional doghouses are available in different sizes, shapes, and materials. Doghouses also differ in the way in which they are manufactured and assembled.

One type of conventional doghouse is one that is built board-by-board from scratch using nails and other non-removable permanent fasteners for connecting the walls and roof. Building a doghouse from scratch involves excessive amounts of time and effort to plan and construct. Furthermore, such a doghouse is usually further limited by a lack of mobility once the house is built, since the nails and other non-removable fasteners for connecting the adjoining walls are permanently fixed to the doghouse. Any holes created by nailing the boards together may become worn and loose once the nails are removed from the doghouse, thereby preventing the nails from being reinserted into the holes. Thus, this type of doghouse is not typically built to be disassembled and reassembled.

Another type of conventional doghouse is prefabricated in two pieces and has a separate roof that is fastened to a body of the doghouse. This type of doghouse uses a large amount of space to store or transport due to the bulkiness of the body and the roof, especially if the doghouse provides a large amount of interior space.

Some conventional doghouses use pegs for connecting walls or other portions of the doghouse. These types of fasteners do not provide a sufficient amount of strength and reliability, since the pegs can slip out of their respective holes.

What has heretofore not been available is a sturdy and reliable prefabricated doghouse that can be assembled and reassembled without excessive wear and tear. Additionally, what has heretofore not been available is a doghouse that can be stored and transported using a minimal amount of space while providing a large amount of interior space for the pet after the doghouse is assembled.

SUMMARY OF THE INVENTION

The present invention relates to a prefabricated doghouse that can be disassembled and reassembled multiple times over the lifetime of the doghouse without experiencing significant wear and tear. The doghouse can be assembled and disassembled efficiently by following a series of easy-to-follow steps. A user can disassemble the doghouse, store the doghouse, and easily assemble the doghouse with a minimal amount of time and effort.

According to an embodiment of the present invention, the doghouse includes a plurality of side panels connecting a front panel and a rear panel; a plurality of slots extending partially through an interior surface of the front panel and the rear panel; the side panels including a plurality of hooks that slide into the slots in the front panel and the rear panel; and a roof connected to the front panel and the rear panel, wherein the hooks connect to receiving members in the slots in the front panel and the rear panel.

According to another embodiment of the present invention, the doghouse includes a base with a plurality of side panels connecting a front section and a rear section; and a first roof panel and a second roof panel each including runners that slidably connect to the front section and the rear section to form a roof of the doghouse.

According to yet another embodiment of the present invention, the doghouse includes a plurality of legs connecting at least two side panels to a front panel and a rear panel; a pair of grooves extending partially through each of the legs; a pair of extrusions on the side panels, the front panel, and the rear panel that slide into the grooves in the legs for forming an interlocking connection so that the side panels, the front panel, and the rear panel form a base of a doghouse; and a roof connected to the base of the doghouse.

A further embodiment of the present invention is directed to a method for assembling a doghouse including a front panel, a plurality of side panels, a rear panel, a first roof panel, and a second roof panel. The method includes the steps of sliding a first roof panel onto a front panel and a rear panel by interlocking a plurality of first runners on the first roof panel with a plurality of first upper ledges on the front panel and the rear panel; and sliding a second roof panel onto the front panel and the rear panel by interlocking a plurality of second runners on the second roof panel with a plurality of second upper ledges on the front panel and the rear panel.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which:

FIG. 11A is an enlarged cross section of a portion of the first and second roof panels of the doghouse as indicated by the dashed circle of FIG. 11;

FIG. 16A is a top plan view of a first roof panel of the doghouse of FIG. 14;

FIG. 16B is a bottom plan view of the first roof panel of FIG. 16A;

FIG. 17 is a bottom plan view of a second roof panel of the doghouse of FIG. 14;

FIG. 19 is a cross section taken along line 19—19 of the doghouse of FIG. 14;

FIG. 20 is an enlarged cross section of the connection of the first roof panel taken along line 20—20 of the doghouse of FIG. 19;

DETAILED DESCRIPTION OF THE PREFERRED EMBODIMENTS

FIGS. 1–24 illustrate a collapsible, prefabricated doghouse 1, 100, 200, according to the present invention, that includes a plurality of panels that interconnect together quickly and conveniently to form a durable and reliable structure. The panels can also be disassembled quickly, and since each panel is relatively flat, the panels may overlap each other in a neat and efficient manner.

Each panel is constructed to releasably interlock with each other to form the doghouse 1, 100, 200. Permanent fasteners such as nails and screws are preferably only used in constructing the panels themselves and not to connect the panels to each other. As shown in the embodiments of the present invention shown in FIGS. 1–24, each panel (excluding the floor panels) is composed of a main panel, and the exterior surfaces of the main panel are carved with a pattern that gives the appearance of a series of parallel slats that are aligned adjacent to each other. Optionally, reinforcing members may be fastened using permanent fasteners to interior sides of the main panel to strengthen the main panel.

Alternatively, instead of being formed as a single piece, each main panel may be composed of a series of parallel slats that are aligned adjacent to each other. The slats may be permanently fixed with respect to each other using glue or another permanent adhesive to form the main panel. Optionally, reinforcing members can be fastened using permanent fasteners to interior sides of the slats to strengthen the panels. The reinforcing members are bonded or fastened perpendicular to the longitudinal direction of the slats.

It is to be understood that the doghouse 1, 100, 200 can be adapted for use by other animals. The dimensions of the doghouse can be altered to accommodate different animals, for example, by increasing or decreasing the dimensions of the doghouse.

Furthermore, the shape of the doghouse 1, 100, 200 can also be altered according to the preferences of the pet owner. For example, instead of having a rectangular shape, the doghouse can have an L-shape.

The main components of the doghouse 1, 100, 200 are preferably made of wood; however, it is to be understood that the doghouse can be made from other types of materials such as steel, a lightweight metal, or a plastic of suitable durability and strength.

Figure 1:
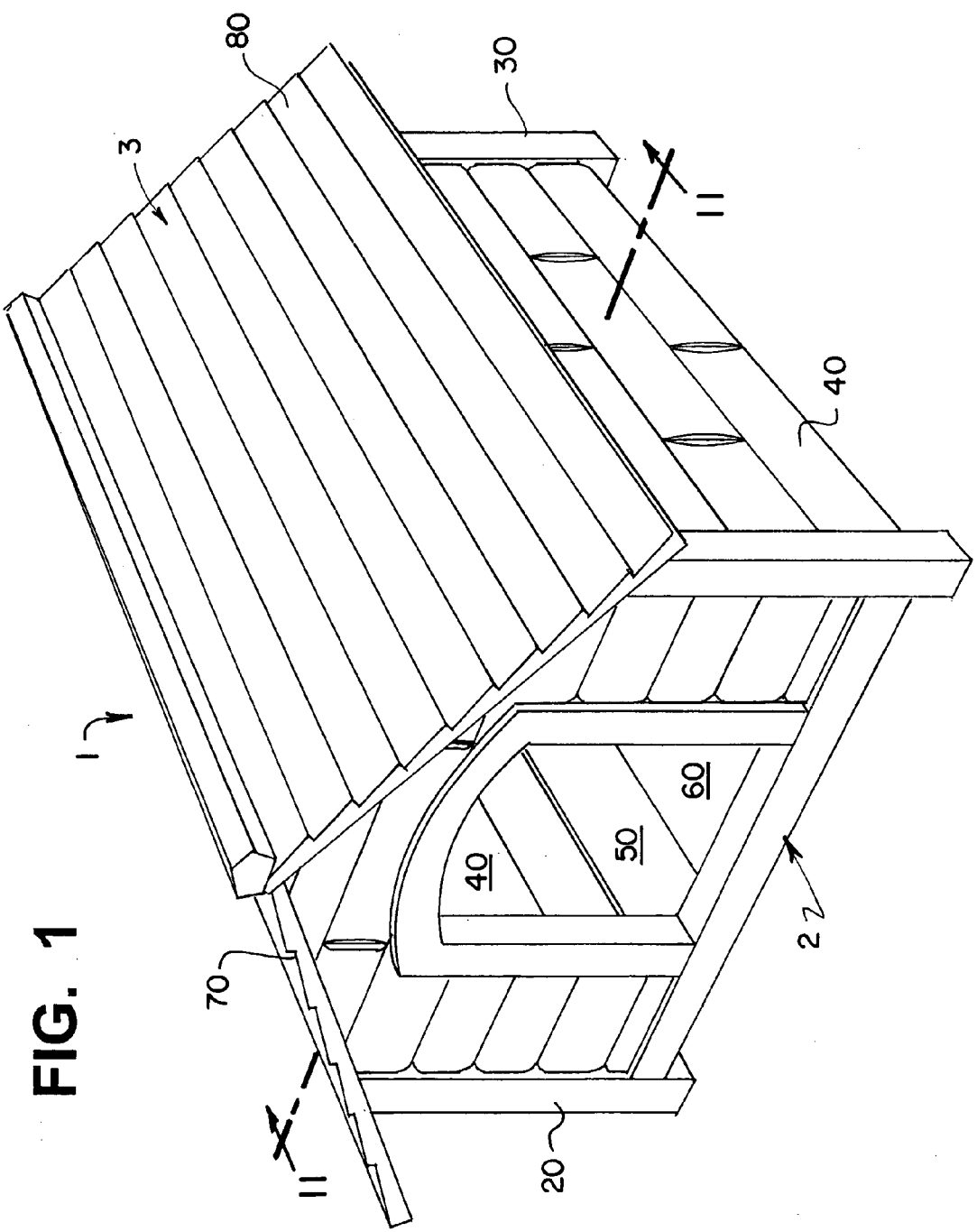
FIG. 1 is a perspective view of an assembled doghouse, according to an embodiment of the present invention.

FIGS. 1–13 illustrate a collapsible, prefabricated doghouse 1, according to an embodiment of the present invention. FIG. 1 is a perspective view of the assembled doghouse 1. The doghouse 1 includes a body 2 supporting a roof 3. The body 2 includes a front panel 20, a rear panel 30, side panels 40, a first floor panel 50, and a second floor panel 60. The roof 3 includes a first roof panel 70 and a second roof panel 80. According to the present embodiment of the invention, the roof 3 is shaped in an inverted V-shape that extends from the front panel 20 to the rear panel 30. The roof 3 also forms eaves by extending forward past the front panel 20 and rearward past the rear panel 30.

Figure 2A:
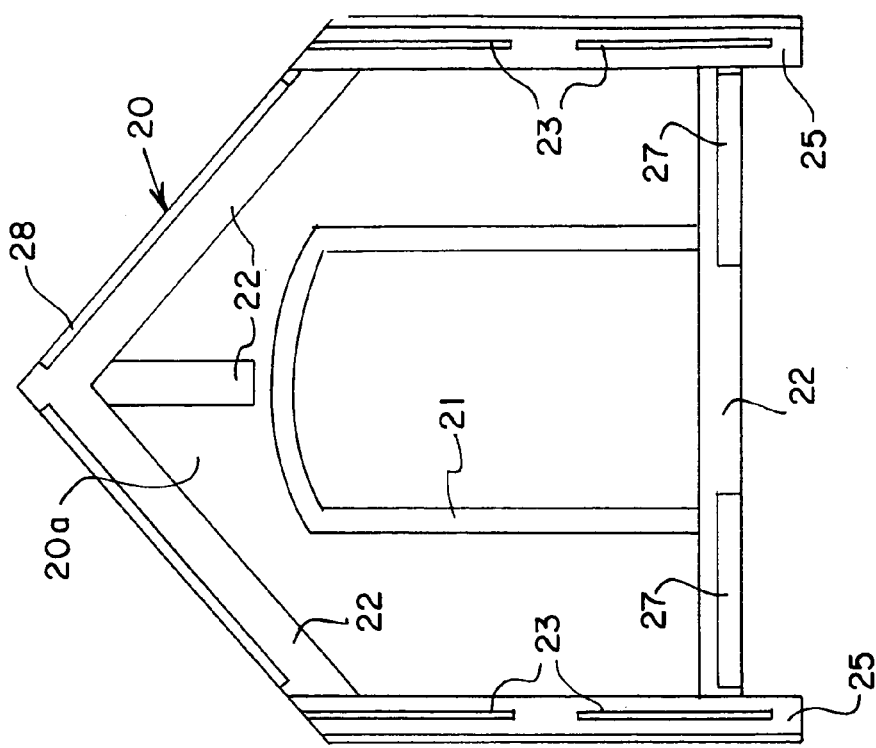
FIG. 2A is an exterior view of a front panel of the doghouse of FIG. 1.
Figure 2B:
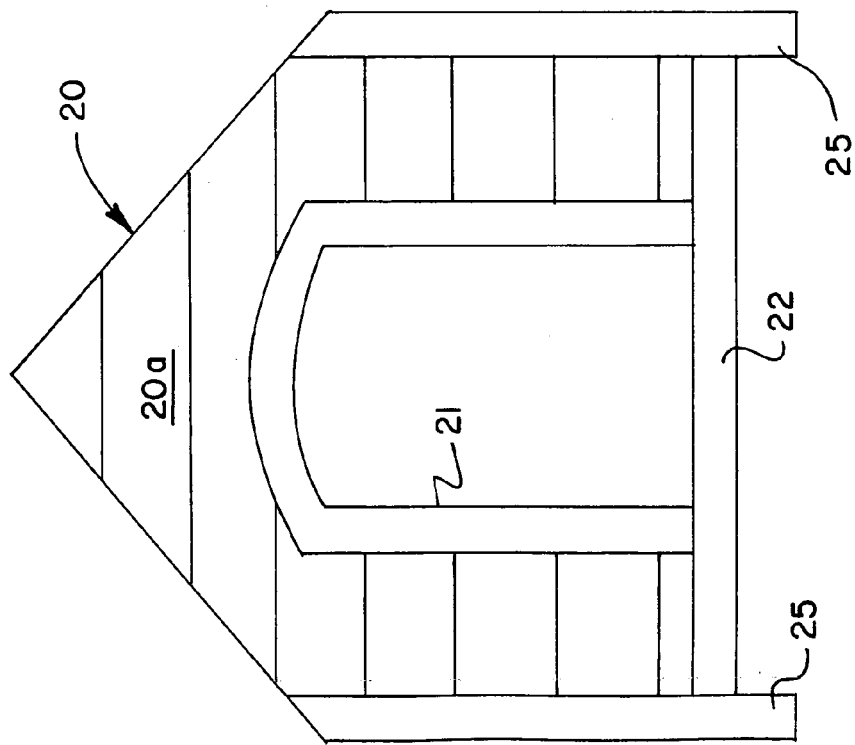
FIG. 2B is an interior view of the front panel of FIG. 2A.

FIG. 2A is an exterior view of the front panel 20 of the doghouse 1; and FIG. 2B is an interior view of the front panel 20. The front panel 20 includes a main panel 20a and an opening 21 that is cut through the main panel 20a of the front panel 20 as a doorway for the dog to pass therethrough and optionally, at least one reinforcing member 22 on the interior side for strengthening the front panel 20.

A slot 23 with a receiving member 24 (FIG. 12) is provided in each leg 25 that extends along each of the sides of the front panel 20 where the front panel 20 connects to the side panels 40.

A pair of lower ledges 27 are provided on the reinforcing member 22 located at the bottom of the interior side of the front panel 20. Alternatively, the lower ledges 27 can be formed as a single lower ledge and/or the lower ledges 27 can be provided directly on the main panel 20a of the front panel 20. The two lower ledges 27 support the first floor panel 50 and the second floor panel 60, respectively.

A pair of upper ledges 28 are provided on the reinforcing members 22 located at the top of the interior side of the front panel 20. The top of the front panel 20 of the present embodiment is angled to contact a bottom surface of the inverted V-shaped roof 3. An upper ledge 28 is provided on each angled side of the top of the front panel 20. Alternatively, the upper ledges 28 can be provided directly on the main panel 20a of the front panel 20. The upper ledges 28 support the first roof panel 70 and the second roof panel 80.

Figure 3B:
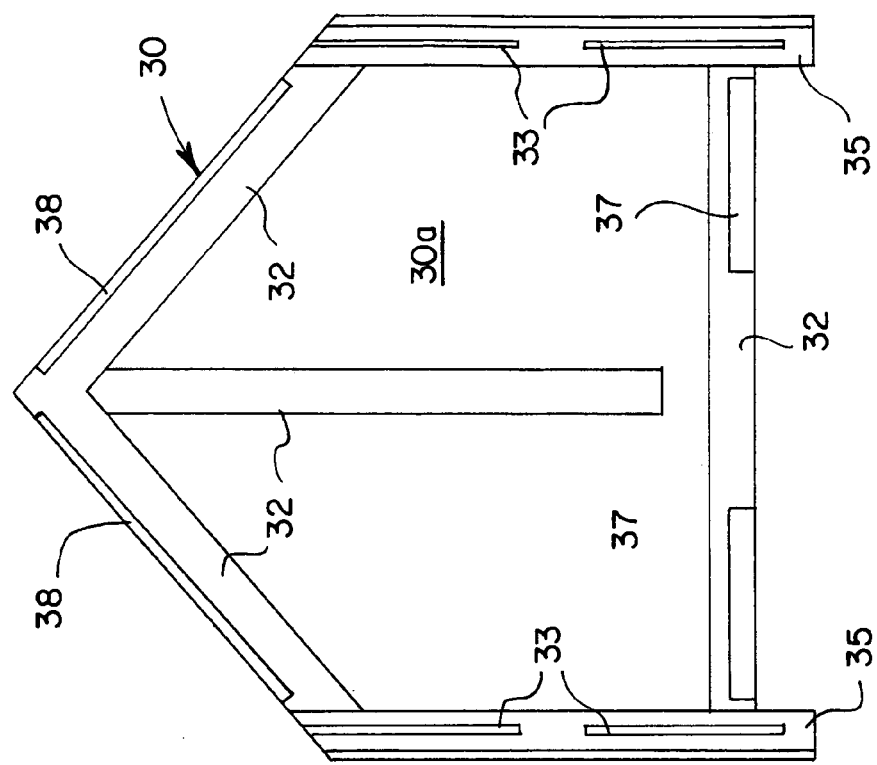
FIG. 3B is an interior view of the rear panel of FIG. 3A.
Figure 3A:
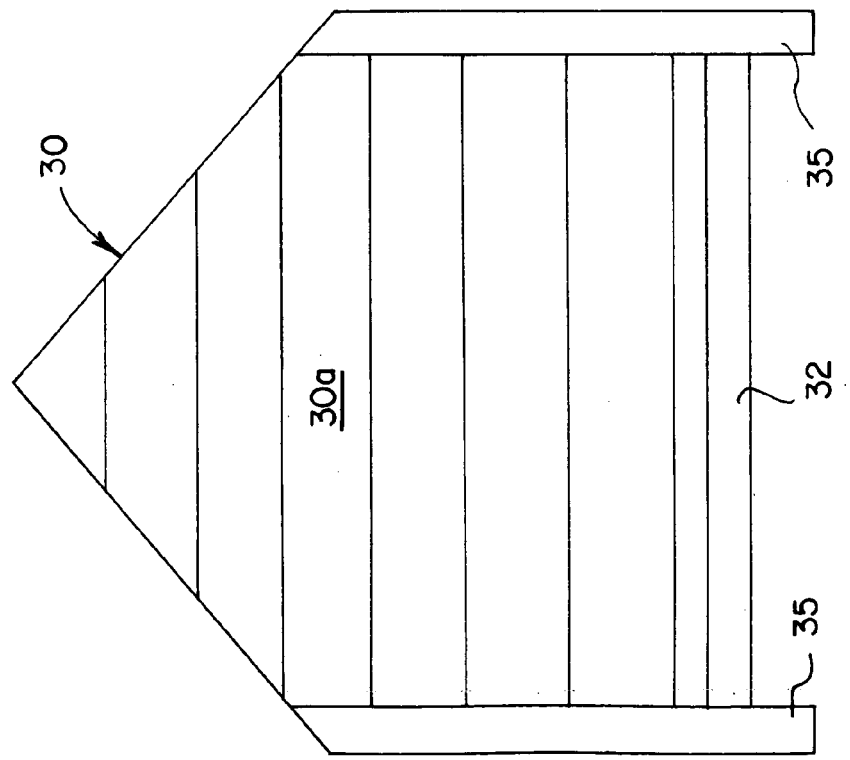
FIG. 3A is an exterior view of a rear panel of the doghouse of FIG. 1.

FIG. 3A is an exterior view of the rear panel 30 of the doghouse 1; and FIG. 3B is an interior view of the rear panel 30. The rear panel 30 includes a main panel 30a and optionally, at least one reinforcing member 32 on the interior side for strengthening the rear panel 30.

A slot 33 with a receiving member 34, which is similar to the receiving member 24 in slot 23 (FIG. 12), is provided in each leg 35 that extends along the sides of the rear panel 30 where the rear panel 30 connects to the side panels 40.

The slots 33 in the rear panel 30 are aligned with the slots 23 in the front panel 20 so that the side panels 40 are positioned substantially parallel to each other and substantially perpendicular to the front panel 20 and the rear panel 30.

The slots 23, 33 extend partially through the respective front and rear panels 20, 30, but do not extend completely through the panels 20, 30.

The legs 25, 35 are permanently bonded to the respective front and rear panels 20, 30. For example, each leg 25, 35 can include a female dovetail (or tee) groove (not shown) that slides over a male dovetail (or tee) extrusion (not shown) on the sides of the main panel 20a, 30a of the respective front and rear panels 20, 30, and the dovetail (or tee) joint is sealed with an adhesive to join the legs 25, 35 to the main panel 20a, 30a of the front and rear panels 20, 30.

A pair of lower ledges 37 are provided on the reinforcing member 32 located at the bottom of the interior side of the rear panel 30. The lower ledges 38 of the rear panel 30 are generally on the same level as the lower ledges 27 of the front panel 20. Alternatively, the lower ledges 38 can be formed as a single lower ledge and/or the lower ledges 38 can be provided directly on the main panel 30a of the rear panel 30. The two lower ledges 38 support the first floor panel 50 and the second floor panel 60, respectively.

A pair of upper ledges 38 are provided on the reinforcing members 32 located at the top of the interior side of the rear panel 30. The upper ledges 38 of the rear panel 30 are generally on the same level as the upper ledges 28 of the front panel 20. The top of the rear panel 30 of the present embodiment is angled to contact a bottom surface of the inverted V-shaped roof 3. An upper ledge 38 is provided on each angled side of the top of the rear panel 30. Alternatively, the upper ledges 38 can be provided directly on the main panel 30a of the rear panel 30. The upper ledges 28 support the first roof panel 70 and the second roof panel 80.

Figure 4A:
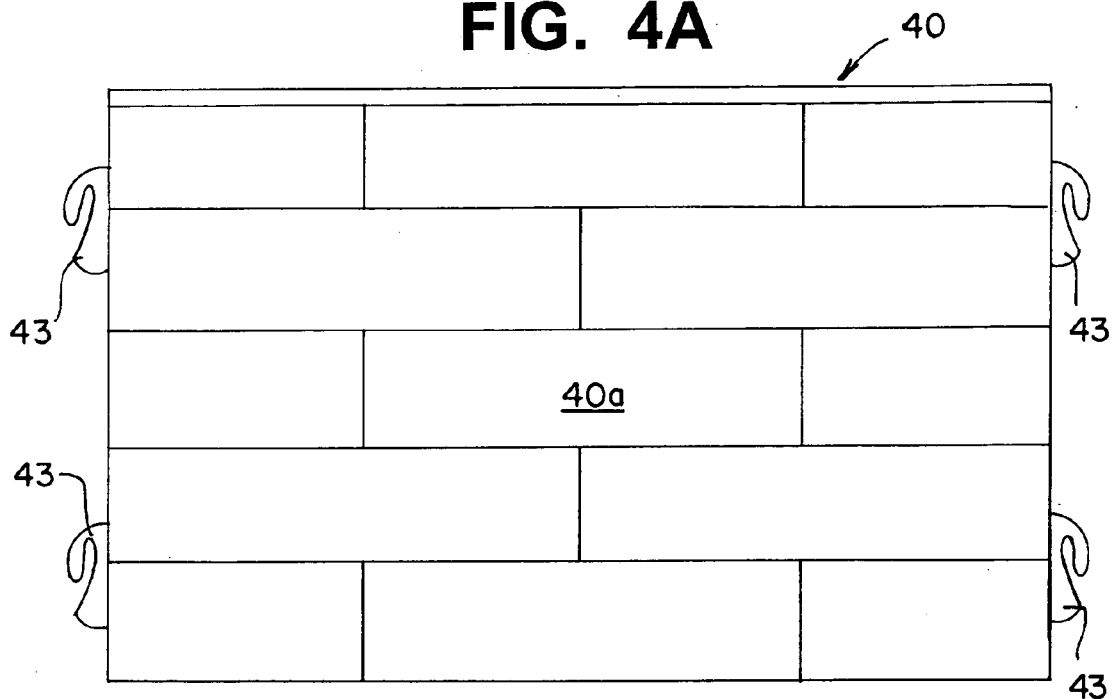
FIG. 4A is an exterior view of a side panel of the doghouse of FIG. 1.
Figure 4B:
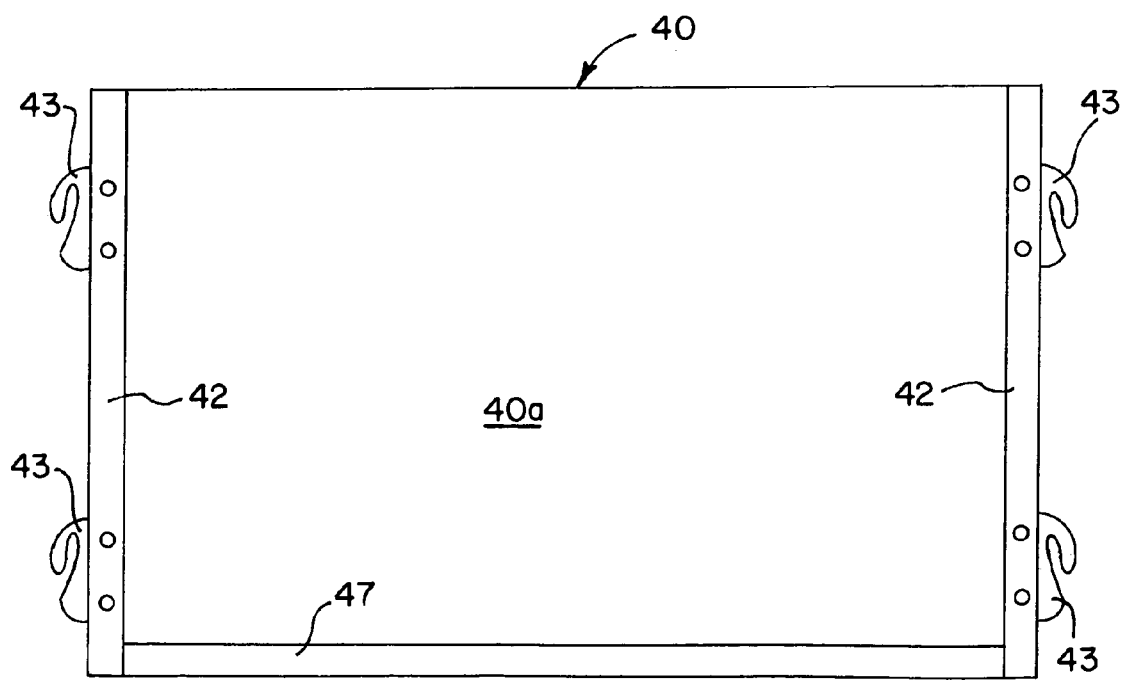
FIG. 4B is an interior view of the side panel of FIG. 4A.

FIG. 4A is an exterior view of one of the side panels 40 of the doghouse 1; and FIG. 4B is an interior view of the side panel 40. The side panels 40 are identical and include a main panel 40a and optionally, at least one reinforcing member 42 on the interior side for strengthening the side panel 40. For example, the side panel 40 according to the present invention includes reinforcing members 42 on each side of the side panel 40 that faces the front panel 20 and the rear panel 30.

Figure 12:
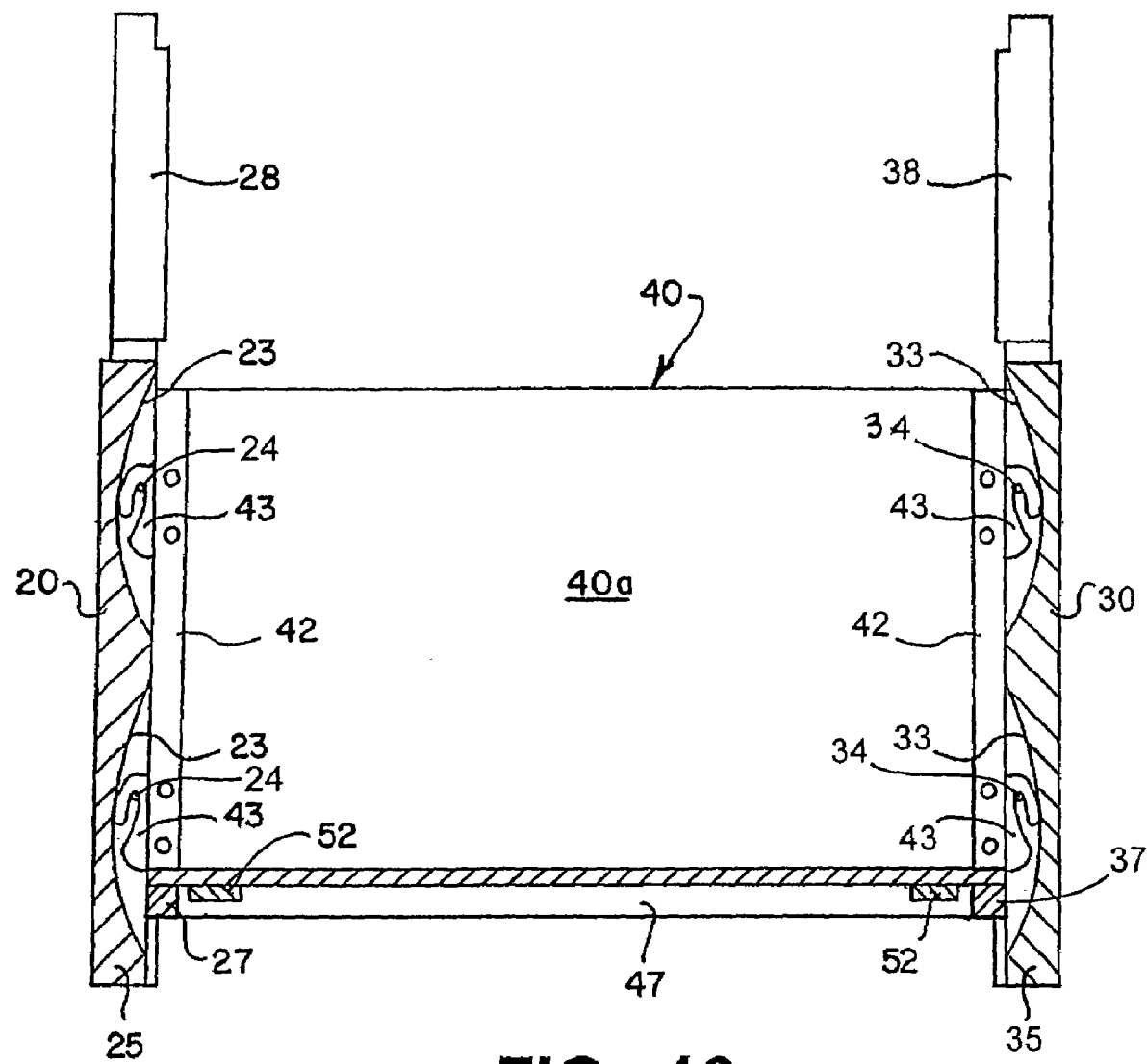
FIG. 12 is a cross section taken along line 12—12 of the doghouse of FIG. 9.

At least one downward facing hook 43 is provided on each reinforcing member 42, e.g., a pair of hooks 43. The hooks 43 allow the side panel 40 to connect to the front panel 20 and the rear panel 30 by sliding through the slots 23, 33 and engaging the receiving members 24 provided inside the slots 23, 33. For example, the receiving member 24 can be a rod spanning the width of the slot 23, 33, as shown in FIG. 12, and shaped to securely receive and retain the hooks 43 so that the side panels 40 are prevented from sliding out unintentionally from within the slots 23,33. The side panels 40 must be pulled upward and then away from the front panel 20 and the rear panel 30, respectively, in order to disassemble the doghouse 1.

The side panel 40 also includes a lower ledge 47 on the interior side of the panel 40 for supporting the first floor panel 50 or the second floor panel 60 depending on which side of the doghouse 1 the side panel 40 is placed. Alternatively, the lower ledge 47 can be formed as a pair of ledges that support the floor panel.

Figure 5A:
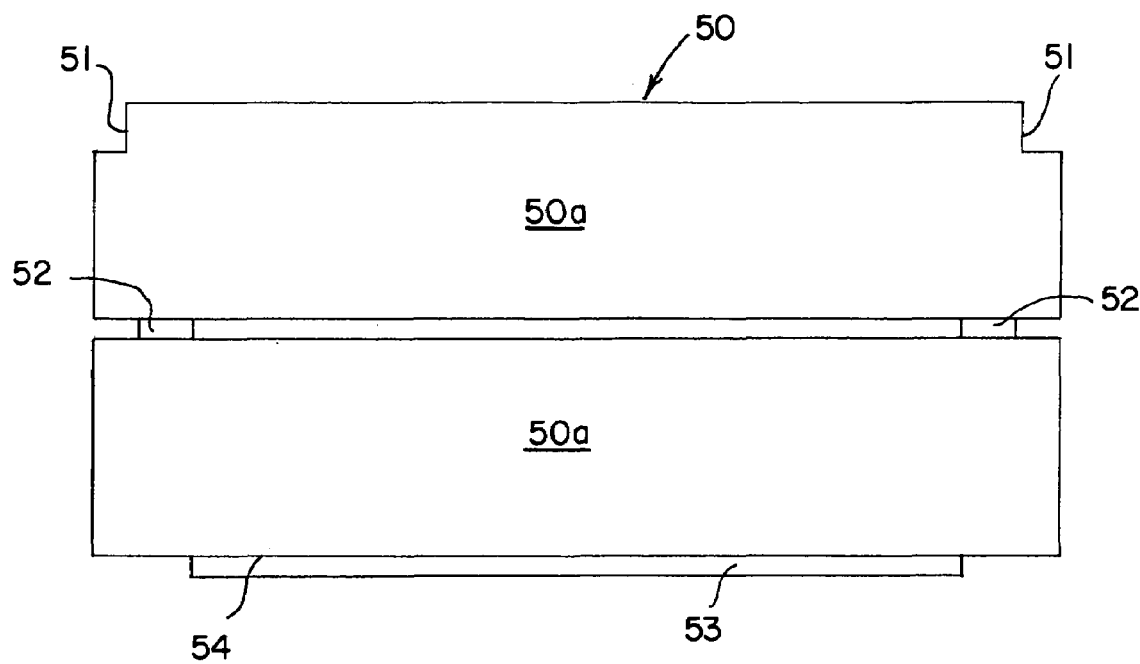
FIG. 5A is a top plan view of a first floor panel of the doghouse of FIG. 1.
Figure 5B:
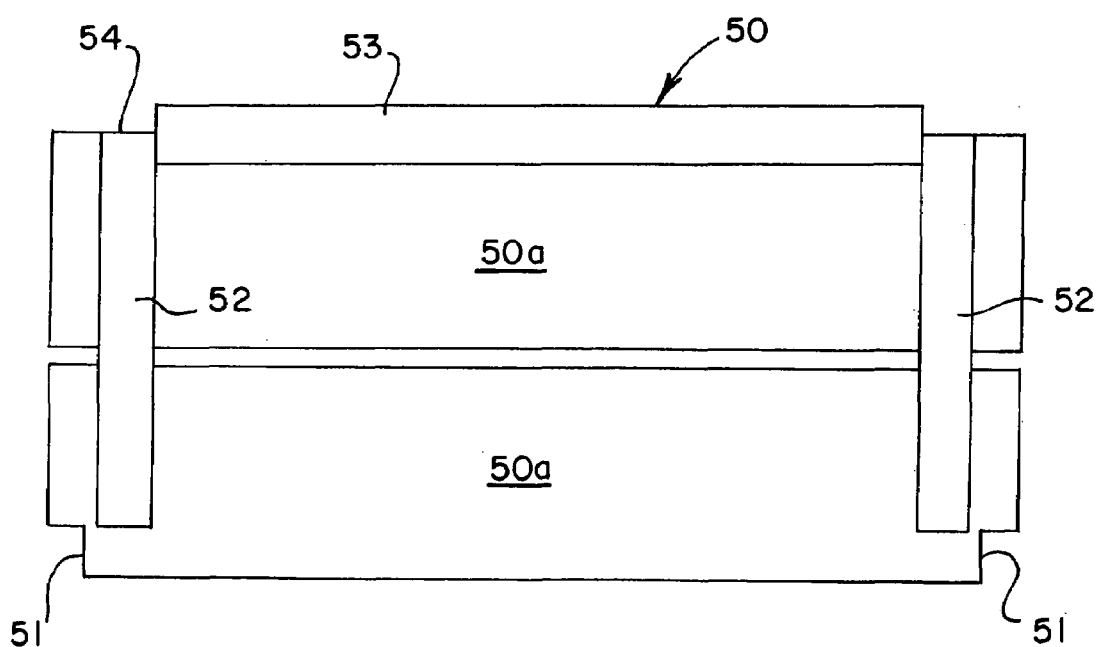
FIG. 5B is a bottom plan view of the first floor panel of FIG. 5A.

FIG. 5A is a top plan view and FIG. 5B is a bottom plan view of the first floor panel 50. The first floor panel 50 is supported by one of the lower ledges 27 of the front panel 20, one of the lower ledges 37 of the rear panel 30, and the lower ledge 47 of the side panel 40. In the example shown in FIGS. 1–13, the first floor panel 50 is located on the left side of the doghouse 1. Thus, the first floor panel 50 is supported by the lower ledge 47 of the side panel 40 on the left side of the doghouse 1. The left and right directions are taken with respect to the doghouse 1 when facing the front of the doghouse 1.

Preferably, two square-shaped corner notches 51 are cut into the left side corners of the first floor panel 50 so that the outline of the corner notches 51 generally match the outline of the legs 25, 35 of the front panel 20 and the rear panel 30 on the left side of the doghouse 1. Thus, the corner notches 51 allow the first floor panel 50 to provide wall-to-wall flooring for the left half of the doghouse 1 between the front panel 20 and the rear panel 30.

The first floor panel 50 includes sub-panels 50a, which are supported on the bottom side by reinforcing members 52. The reinforcing members 52 are bonded or fastened at an angle, e.g., perpendicular, to the longitudinal direction of the sub-panels 50a.

A ledge 53 is also provided on the underside surface of a right side edge 54 of the first floor panel 50 parallel to the first and the second floor panels 50, 60. The ledge 53 supports a left side edge 64 of the second floor panel 60 so that the first floor panel 50 and the second floor panel 60 are generally co-planar. Alternatively, the ledge 53 could be provided on the underside surface of the left side edge 64 of the second floor panel 60 instead of the right side edge 54 of the first floor panel 50 so that the ledge 53 could support the right side edge 54 of the first floor panel 50.

In the example shown in FIGS. 1–13, the second floor panel 60 is located on the right side of the doghouse 1. Thus, the second floor panel 50 is supported by the lower ledge 47 of the side panel 40 on the right side of the doghouse 1, one of the lower ledges 27 of the front panel 20, and one of the lower ledges 37 of the rear panel 30.

The second floor panel 60 (FIG. 9) also includes two square-shaped corner notches 61 corresponding to the outline of the legs 25, 35 of the front panel 20 and the rear panel 30 on the right side of the doghouse 1. The corner notches 61 allow the second floor panel 60 to provide wall-to-wall flooring for the right side half of the doghouse 1 between the front panel 20 and the rear panel 30.

The second floor panel 60 includes sub-panels 60a, which are supported on the bottom side by reinforcing members 62. The reinforcing members 62 are bonded or fastened at an angle, e.g., perpendicular, to the longitudinal direction of the sub-panels 60a.

Thus, the floor panels 50, 60 are not fastened permanently to the front panel 20, the rear panel 30, or the side panels 40. Instead, the floor panels 50, 60 are held in place by the weight of the floor panels 50, 60 and any objects that are placed on top of the floor panels 50, 60.

Alternatively, the floor panels 50, 60 can be configured such that the floor panels 50, 60 provide flooring for a front and a rear half of the doghouse 1, respectively. For example, the first floor panel 50 can be supported by the lower ledges 27 of the front panels 20 and by the lower ledges 47 of the side panels 40. The second floor panel 60 can be supported by the lower ledges 37 of the rear panel 30 and by the lower ledges 47 of the side panels 40.

Figure 6A:
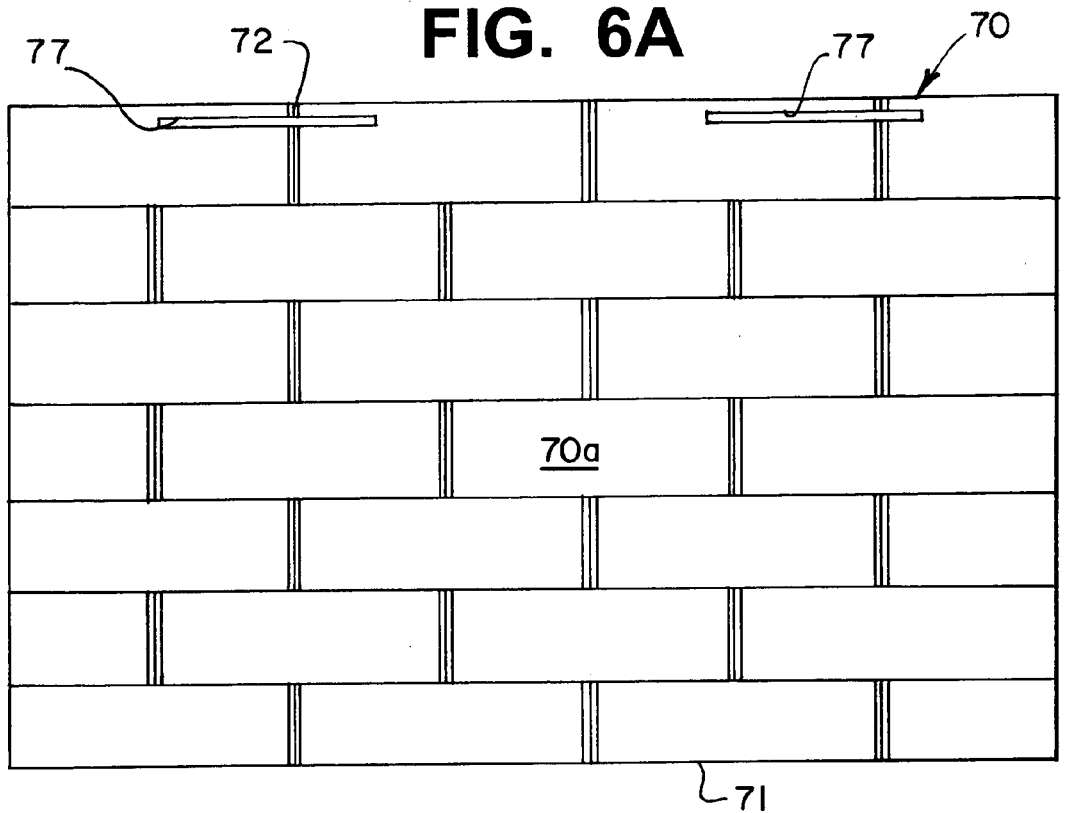
FIG. 6A is a top plan view of a first roof panel of the doghouse of FIG. 1.
Figure 6B:
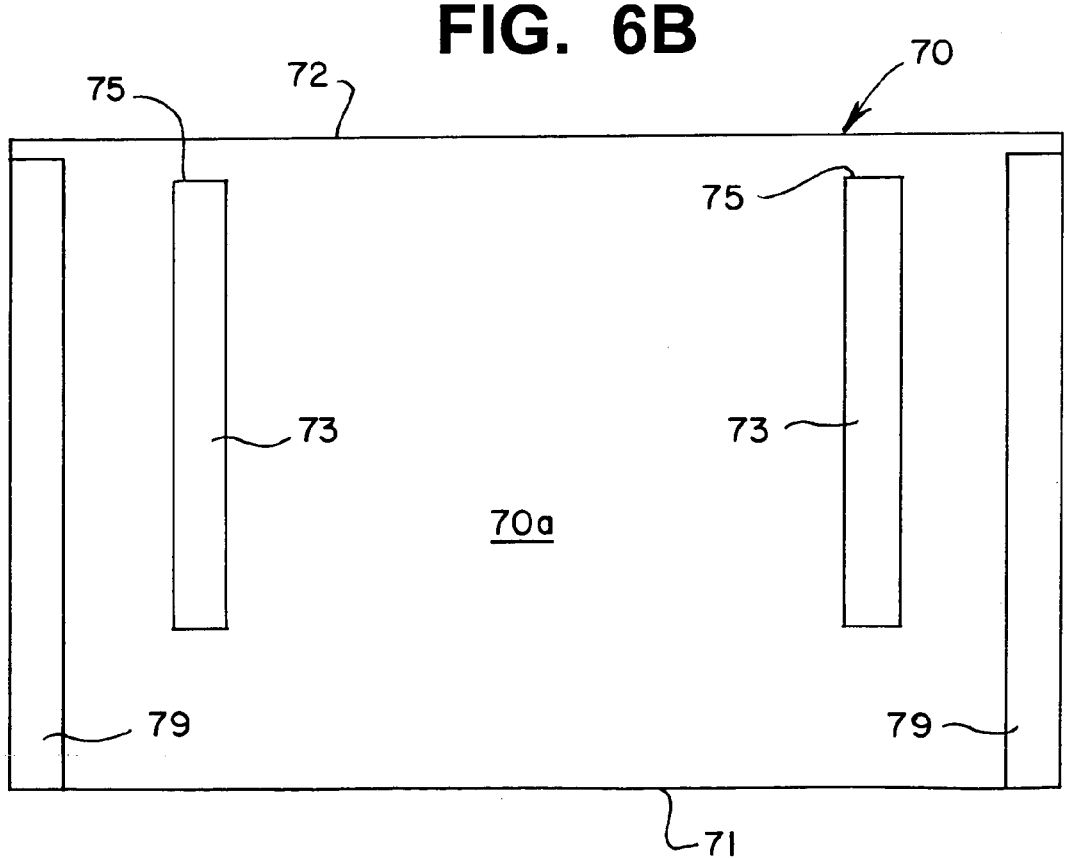
FIG. 6B is a bottom plan view of the first roof panel of FIG. 6A.
Figure 7:
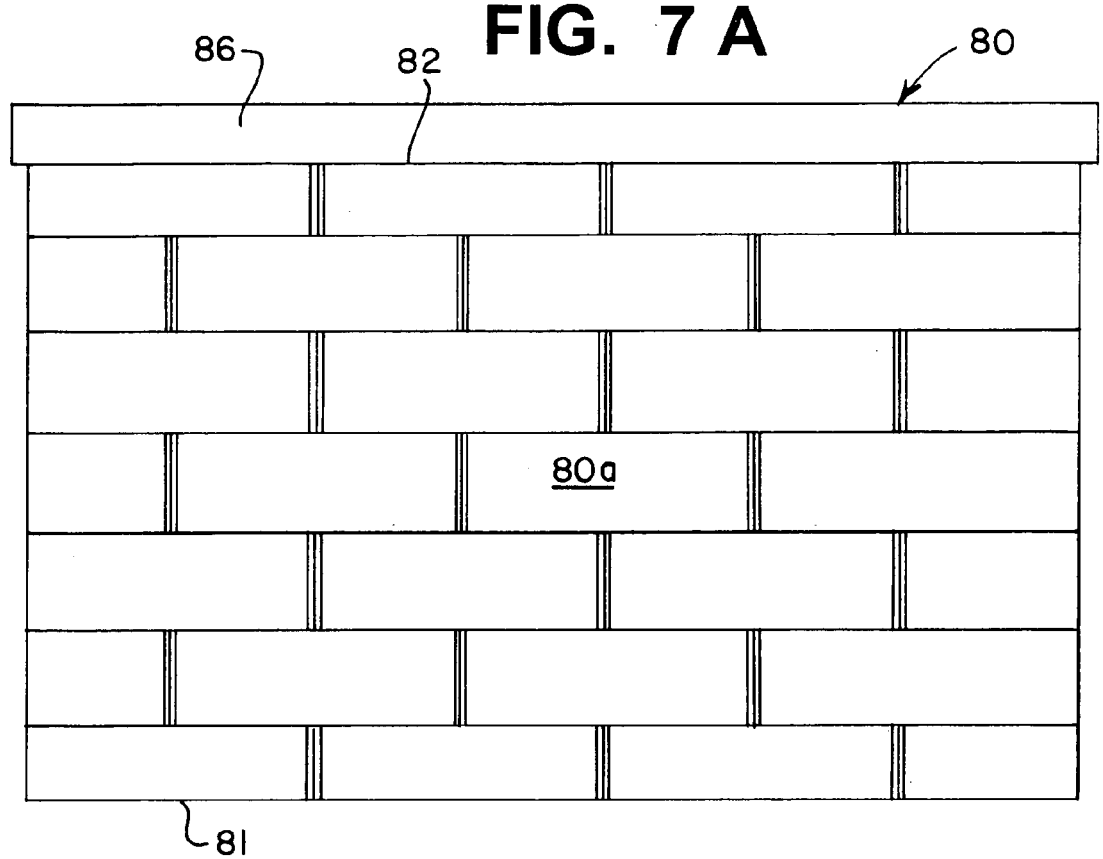
FIG. 7A is a top plan view of a second roof panel of the doghouse of FIG. 1.
FIG. 7B is a bottom plan view of the second roof panel of FIG. 7A.
Figure 7:
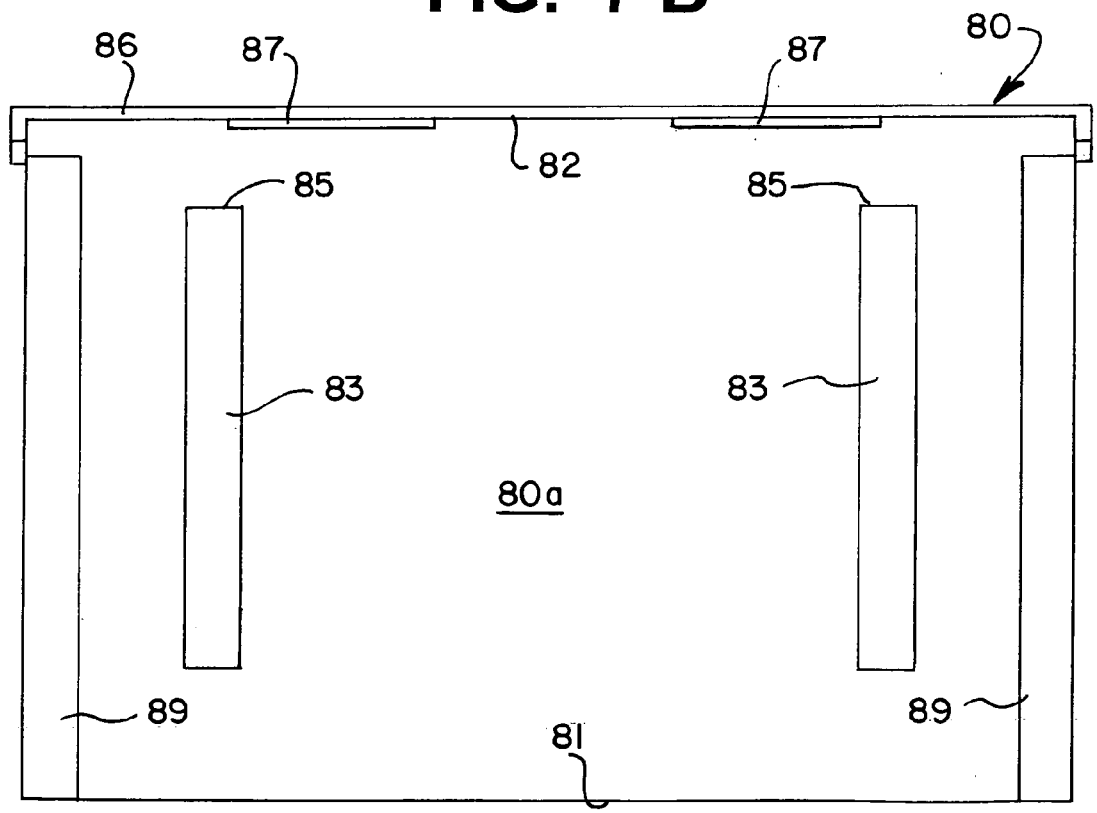

FIG. 6A is a top plan view of the first roof panel 70 of the doghouse 1; and FIG. 6B is a bottom plan view of the first roof panel 70. The first roof panel 70 can be placed on either side of the doghouse 1 while the second roof panel 80 is placed on the opposite side of the doghouse 1 from the first roof panel 70. However, the first roof panel 70 must be assembled onto the doghouse 1 before the second roof panel 80 since a portion of the second roof panel 80 overlaps the first roof panel 70, as will be described below.

The first roof panel 70 includes a main panel 70a with a lower edge 71 and an upper edge 72 that is positioned closer to the top of the doghouse 1. As shown in FIG. 6B, runners 73 are provided on the interior side of the first roof panel 70 perpendicular to the lower edge 71 and the upper edge 72. The runners 73 include L-shaped tracks, which are similar to L-shaped tracks 84 in the second roof panel 80 shown in FIG. 13, which complement and slide along the upper ledges 28, 38 of the front panel 20 and the rear panel 30. The first roof panel 70 also includes slots 77 on the exterior surface thereof and close to the upper edge 72. The slots 77 extend partially through the first roof panel 70, but not completely through the first roof panel 70. Optionally, the first roof panel 70 can include reinforcing members 79 for supporting the main panel 70a.

Upper ends 75 of the tracks in the runners 73 limit the sliding movement of the first roof portion 70 against the upper ledges 28, 38. The closed upper end 75 of the runner 73 almost extends to the upper edge 72 of the first roof panel 70, but does not extend to the edge 72 to prevent the roof panels 70, 80 from damaging each other during the assembly of the doghouse 1. The open opposite end of the runner 73 is positioned away from the lower edge 71 of the first roof panel 70 but leaves enough space so that the runner 73, which is contained entirely within the interior of the doghouse 1, does not prevent the first roof panel 70 from extending past the adjacent side panel 40, thereby forming the eaves.

FIG. 7A is a top plan view of the second roof panel 80 of the doghouse 1; and FIG. 7B is a bottom plan view of the second roof panel 80. The second roof panel 80 includes a main panel 80a with a lower edge 81 and an upper edge 82 that is positioned closer to the top of the doghouse 1. Similar to the first roof panel 70, the second roof panel 80 includes runners 83 on the interior side of the second roof panel 80. The runners 83 are perpendicular to the lower edge 81 and the upper edge 82 and include the L-shaped tracks 84 (FIG. 13), which complement and slide along the upper ledges 28, 38 of the front panel 20 and the rear panel 30. Optionally, the second roof panel 80 can include reinforcing members 89 for supporting the main panel 80a.

Upper ends 85 of the tracks 84 in the runners 83 limit the sliding movement of the second roof portion 80 against the upper ledges 28, 38. The closed upper end 85 of the runner 83 almost extends to the upper edge 82 of the second roof panel 80, but does not extend to the edge 82 to prevent the roof panels 70, 80 from sliding against each other and damaging each other during the assembly of the doghouse 1. The open opposite end of the runner 83 is positioned away from the lower edge 81 of the second roof panel 80 but leaves enough space so that the runner 83, which is contained entirely within the interior of the doghouse 1, does not prevent the second roof panel 80 from extending past the adjacent side panel 40, thereby forming the eaves.

To avoid interference between the upper edge 72 of the first roof panel 70 and the runners 83 and reinforcing members 89 of the second roof panel 80, the runners 83 of the second roof panel 80 are formed taller than the runners 73 of the first roof panel 70. Thus, gaps 83a (FIG. 13) are formed between the tracks 84 and the upper ledges 28, 38 of the front panel 20 and the rear panel 30, respectively. The gaps are not formed between the tracks in the first roof panel 70 and the upper ledges 28, 38 of the front panel 20 since the runners 73 of the first roof panel 70 are tall enough to produce a gapless connection between the tracks in the first roof panel 70 and the upper ledges 28, 38.

An inverted V-shaped capping 86 is also provided on the upper edge 82 of the second roof panel 80. The capping 86 is permanently fastened to the upper edge 82 of the second roof panel 80 using an adhesive, for example, and prevents outside elements, e.g., rain, dirt, and other debris, from falling into the doghouse 1 through the gap between the upper edges 72, 82 of the roof panels 70, 80.

Tongue members 87 are provided on an interior side of the capping 86. The slots 77 on the first roof panel 70 are formed complementary to the tongue members 87 and receive the tongue members 87 to allow the second roof panel 80 to connect securely to the first roof panel 70.

Optionally, the second roof panel 80 can include reinforcing members 89 for supporting the main panel 80a.

Assembly

The assembly of the doghouse 1 will now be described.

Figure 8:
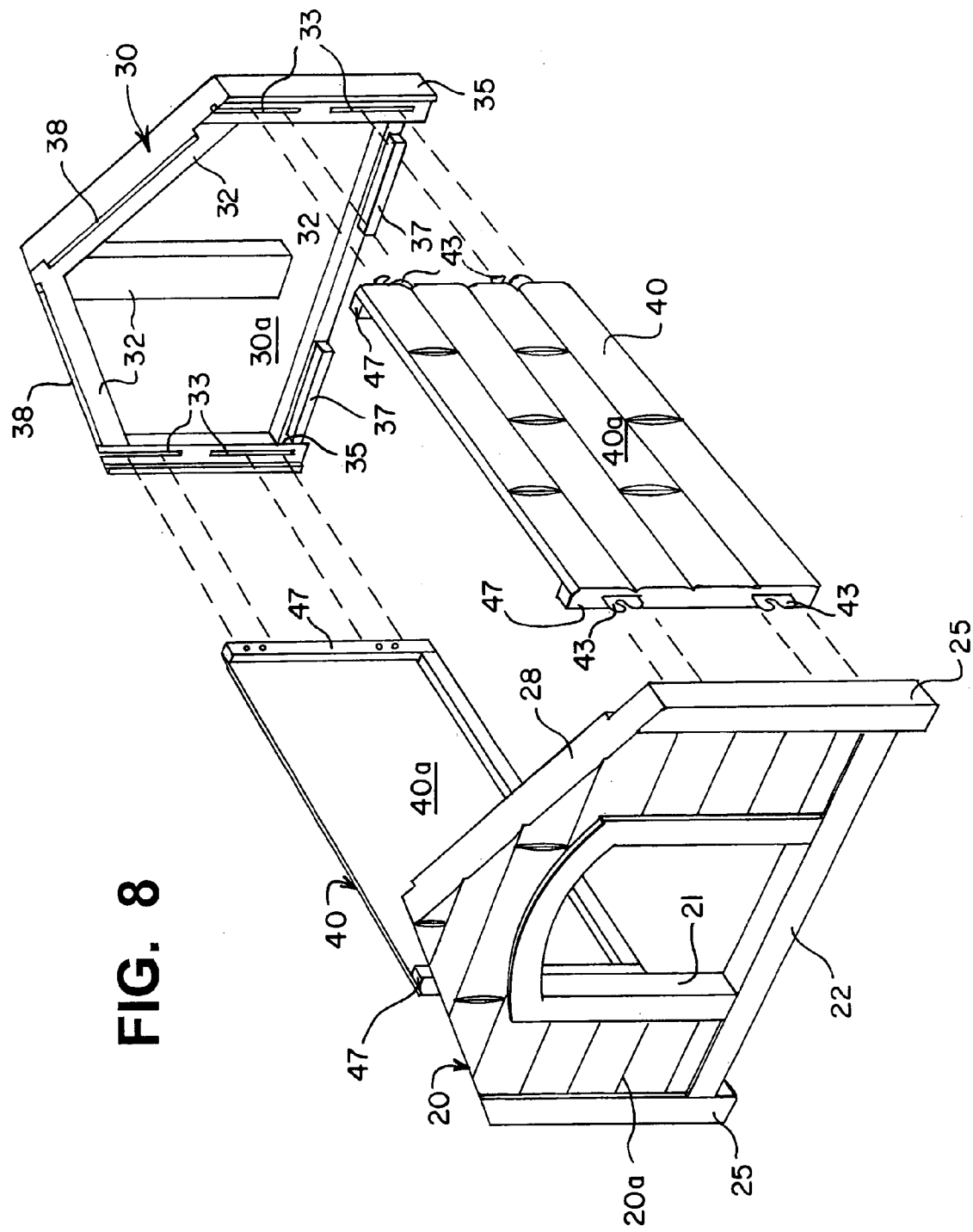
FIG. 8 is an exploded perspective view showing the assembly of the front, rear, and side panels of the doghouse of FIG. 1.
Figure 9:
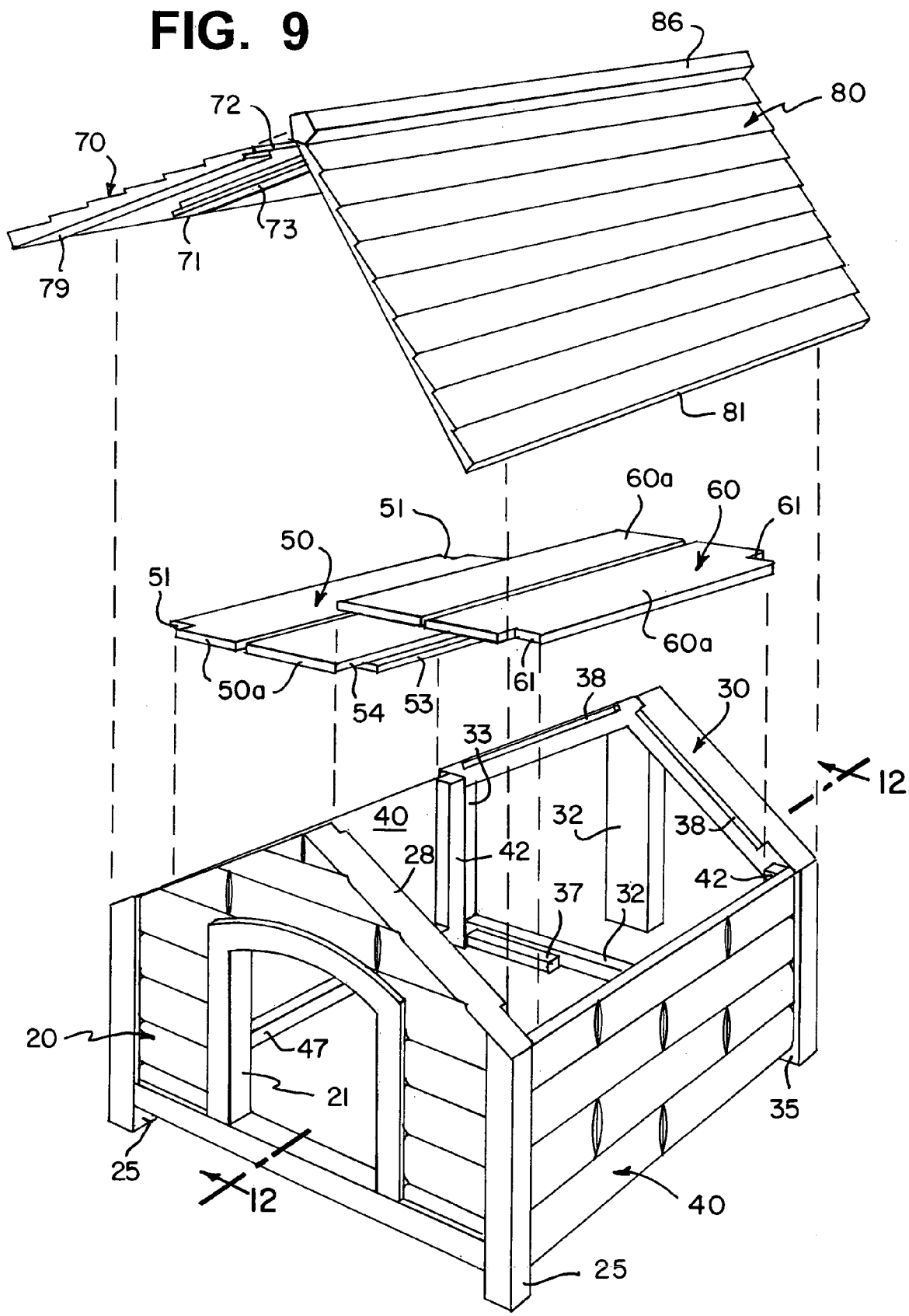
FIG. 9 is an exploded perspective view showing the assembly of the first and second floor panels of the doghouse of FIG. 1.
Figure 10:
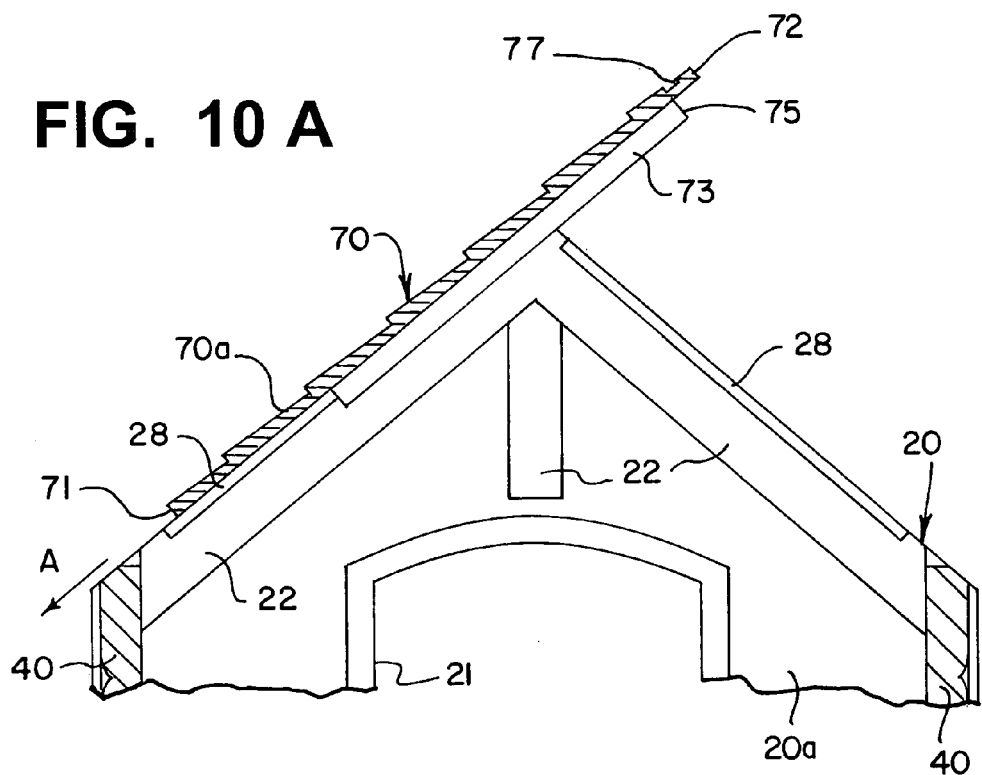
FIG. 10A is a cross section showing the assembly of the first roof panel of the doghouse of FIG. 1.
FIG. 10B is a cross section showing the assembly of the second roof panel of the doghouse of FIG. 1.
Figure 10:
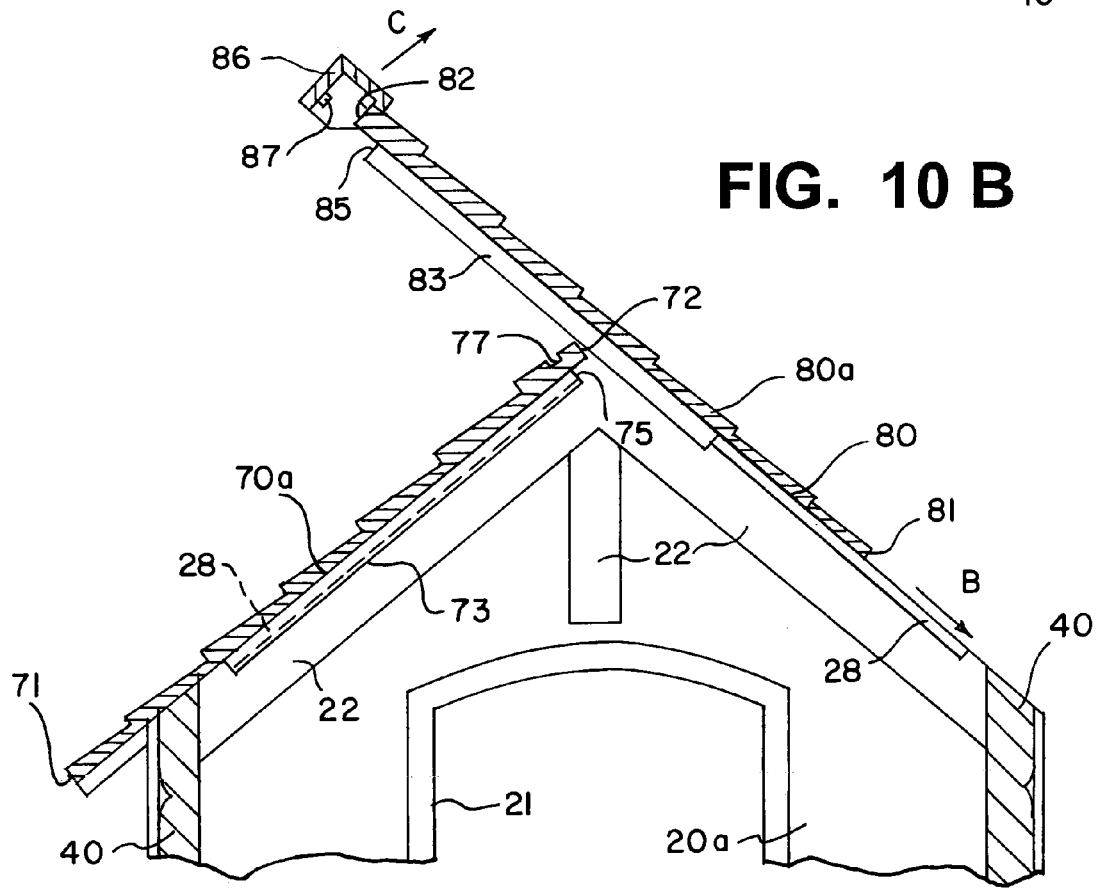

FIG. 8 is an exploded perspective view showing the assembly of front panel 20, the rear panel 30, and the side panels 40 of the doghouse 1; FIG. 9 is an exploded perspective view showing the assembly of the first and the second floor panels 50, 60 and the first and the second roof panels 70, 80 of the doghouse 1; and FIG. 12 is a cross section taken along line 12—12 of the doghouse of FIG. 9.

The side panels 40 are connected to the front panel 20 and the rear panel 30 by interlocking the hooks 43 on both sides of the side panel 40 with the receiving members 24 in the slots 23, 33 of the front panel 20 and rear panel 30.

After connecting the side panels 40 to the front panel 20 and the rear panel 30, the floor panels 50, 60 are lowered into a structure formed by the front panel 20, rear panel 30, and side panels 40. First, the first floor panel 50 is lowered into the left half of the structure so that the ledge 53 is located in the center ready to receive and support the second floor panel 60. The corner notches 51 of the first floor panel 50 are generally aligned flush against the left side legs 25, 35 of the front panel 20 and the rear panel 30.

Then, the second floor panel 60 is lowered into the right half of the structure so that the left side edge 64 is supported by the ledge 53 of the first floor panel 50 and the corner notches 61 of the second floor panel 60 are generally aligned flush against the right side legs 25, 35 of the front panel 20 and the rear panel 30.

Next, the first and the second roof panels 70, 80 are attached to the body 2 of the doghouse 1. The roof panels 70, 80 can be attached to the body 2 after the body 2 (the front panel 20, the rear panel 30, the side panels 40, the first floor panel 50, and the second floor panel 60) is assembled. The first roof panel 70 is attached to the body 2 before the second roof panel 80.

Figure 11:
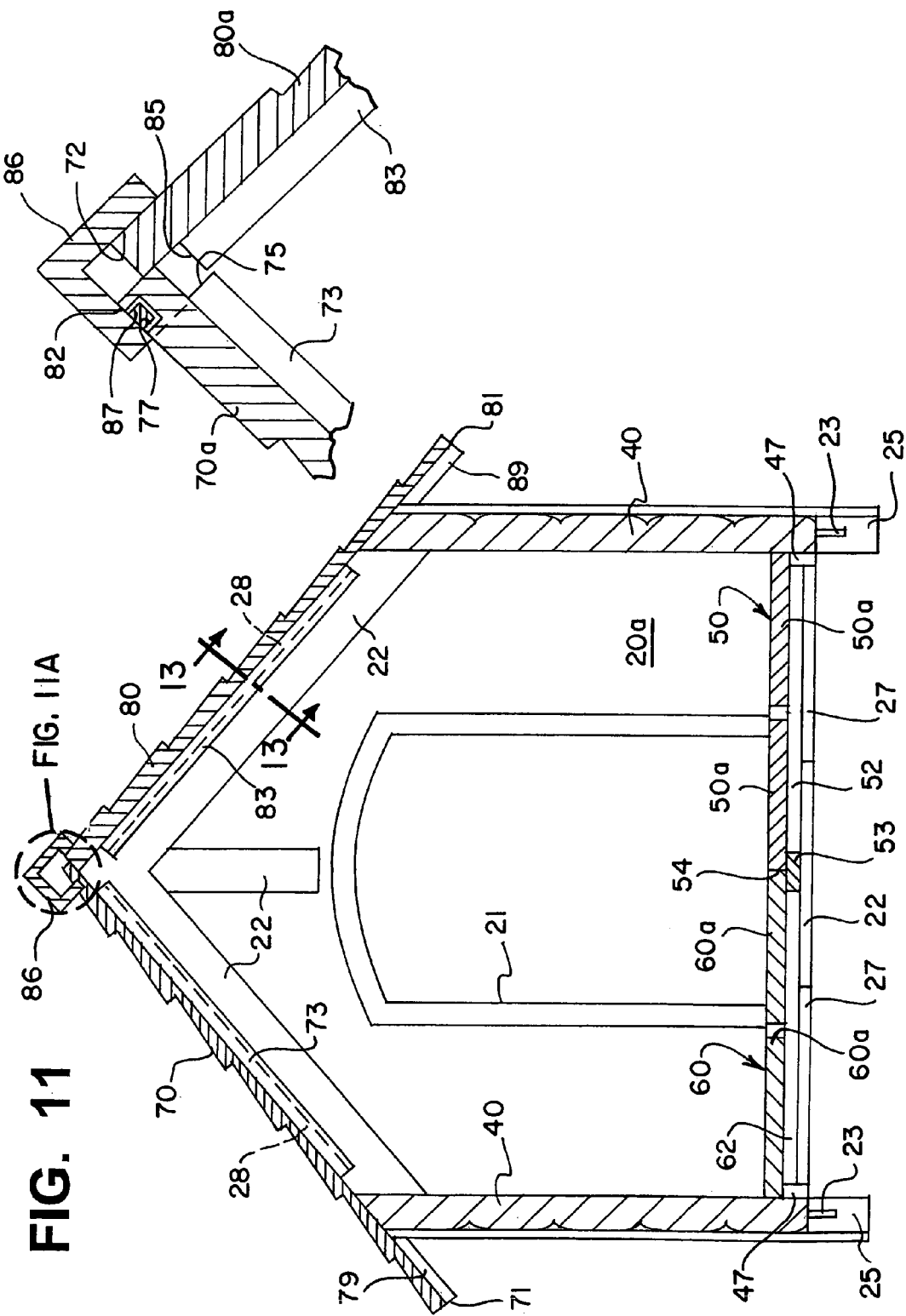
FIG. 11 is a cross section taken along line 11—11 of the doghouse of FIG. 1.
Figure 13:
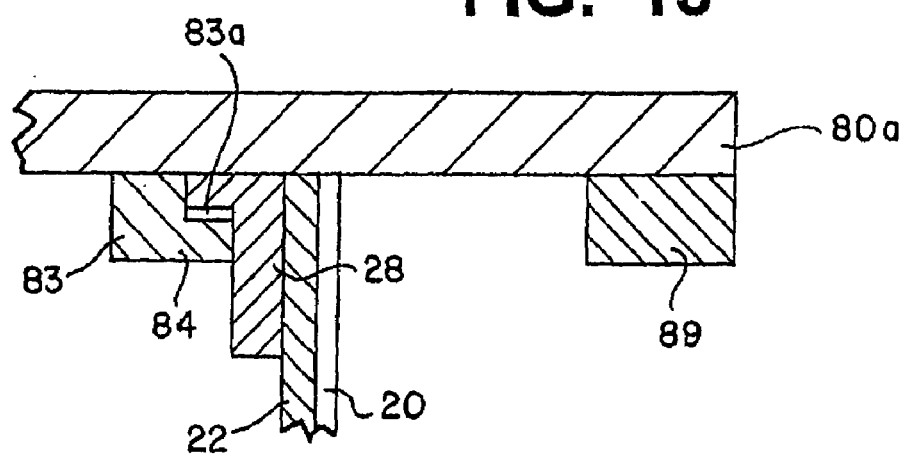
FIG. 13 is an enlarged cross section of the connection of the first roof panel taken along line 13—13 of the doghouse of FIG. 11.

FIG. 10A is a cross section showing the assembly of the first roof panel 70 onto the body 2 of the doghouse 1; FIG. 10B is a cross section showing the assembly of the second roof panel 80 onto the body 2 of the doghouse 1; FIG. 11 is a cross section taken along line 11—11 of the doghouse 1; FIG. 11A is an enlarged cross section of a portion of the first and second roof panels 70, 80 as indicated by the dashed circle of FIG. 11; and FIG. 13 is an enlarged cross section of the connection of the first roof panel 70 taken along line 13—13 of FIG. 11.

The runners 73, 83 allow the first and the second roof panels 70, 80, respectively, to attach to the body 2 of the doghouse 1. The runners 73, 83 toward the front of the doghouse 1 engage the respective upper ledges 28 at the top of the front panel 20, and the runners 73, 83 toward the rear of the doghouse 1 engage the respective upper ledges 38 at the top of the rear panel 30. The tracks 84 lock the first and the second roof panels 70, 80 against the respective upper ledges 28 to prevent the first and the second roof panels 70, 80 from being pulled away from the body 2 of the doghouse 1. When the first and second roof panels 70, 80 are attached to the body 2 of the doghouse 1, the runners 73, 83 are positioned in the interior of the doghouse 1.

Since the tracks 84 open toward the respective upper ledges 28, 38, the first and the second roof panels 70, 80 are unable to slide forward or rearward from the upper ledges 28, 38. Instead, the first and the second roof panels 70, 80 are able to slide in the direction of arrows A and B, respectively, so that the tracks 84 slide against the upper ledges 28, 38.

To attach the first roof panel 70, the first roof panel 70 slides along the direction shown by arrow A in FIG. 10A. The runners 73 engage one of the upper ledges 28 at the top of the front panel 20 and one of the upper ledges 38 at the top of the rear panel 30, respectively, until the upper ends 75 of the tracks in the runners 73 prevent the first roof panel 70 from sliding farther.

The closed upper ends 75 of the tracks in the runners 73 limit the sliding movement of the first roof portion 70 against the upper ledges 28, 38. Thus, once the top edge of the upper ledges 28, 38 abut against the upper ends 75 of the tracks in the runners 73, then the first roof portion 70 stops moving in the direction of arrow A. This final position is shown in FIG. 10B.

As shown in FIG. 10B, the second roof panel 80 slides along the direction shown by arrow B in FIG. 10B. The runners 83 engage one of the upper ledges 28 at the top of the front panel 20 and one of the upper ledges 38 at the top of the rear panel 30, respectively, until the ends 85 of the tracks 84 in the runners 83 prevent the second roof panel 80 from sliding farther.

As the user slides the second roof panel 80 in the direction of arrow B, the upper edge 82 of the second roof panel 80 is pulled out in the direction of arrow C. As described above and shown in FIG. 13, the runners 83 of the second roof panel 80 are taller than the runners 73 of the first roof panel 70. Thus, the gap 83a is formed between the tracks 84 and the upper ledges 28, 38 of the front panel 20 and the rear panel 30, respectively. The gap 83a allows the user to lift the upper edge 82 of the second roof panel 80 in the direction of arrow C, thereby allowing the second roof panel 80 to slide in the direction of arrow B without sliding against and damaging the upper edge 72 of the first roof panel 70.

The upper ends 85 of the tracks 84 in the runners 83 limit the sliding movement of the second roof panel 80 against the upper ledges 28, 38. Thus, once the top edge of the upper ledges 28, 38 abut against the upper ends 85 of the tracks 84 in the runners 83, then the second roof portion 80 stops moving in the direction of arrow B. Furthermore, to ensure a secure fit between the first and the second roof panels 70, 80, the tongue members 87 in the capping 86 of the second roof panel 80 are inserted into the slots 77 on the first roof panel 70, as shown in FIG. 11A. The final assembled doghouse is shown in FIG. 11.

Alternate Embodiments

FIGS. 14–20 illustrate a collapsible, prefabricated doghouse 100, according to another embodiment of the present invention. Unless otherwise stated, the components of the doghouse 100 shown in FIGS. 14–20 that are identical to the parts of the doghouse 1 described above are denoted by identical reference characters and will not be described in detail.

The doghouse 100 includes front panel 20, rear panel 30, side panels 40, first floor panel 50, second floor panel 60, first roof panel 70, and second roof panel 80 as described above with reference to doghouse 1 of FIGS. 1–13. However, in doghouse 100, there are some modifications to front panel 20, rear panel 30, first roof panel 70, and second roof panel 80.

Figure 14:
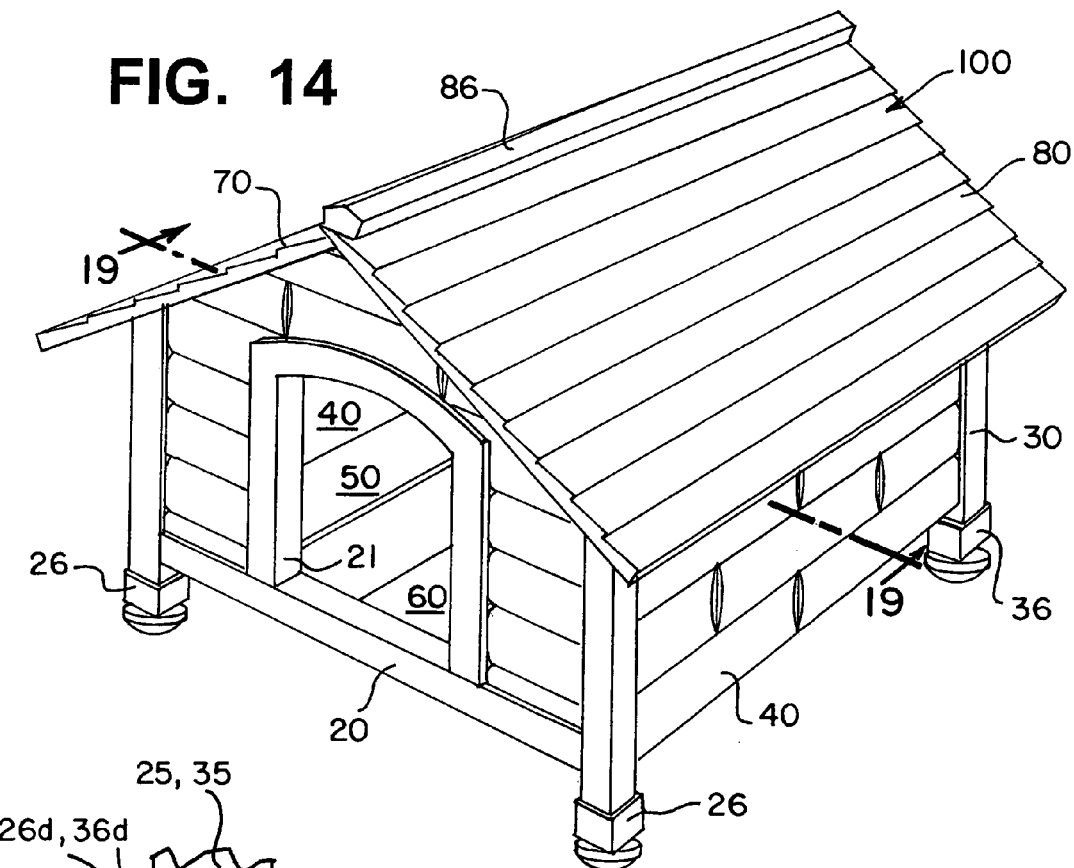
FIG. 14 is a perspective view of an assembled doghouse, according to another embodiment of the present invention.
Figure 15:
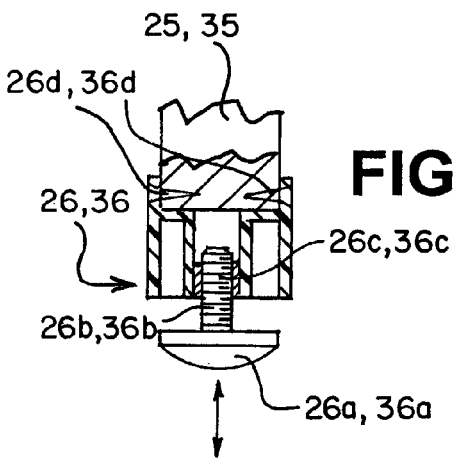
FIG. 15 is an enlarged cross section of a leg of the doghouse of FIG. 14.

FIG. 14 is a perspective view of the assembled doghouse 100; and FIG. 15 is an enlarged cross section of a leg 25, 35 of the doghouse 100. The front panel 20 and the rear panel 30 of the doghouse 100 are modified by providing feet 26, 36.

Feet 26, 36 are provided at the bottom end of each leg 25, 35 of the front panel 20 and the rear panel 30, respectively. The feet 26, 36 have rubber caps 26a, 36a to prevent the doghouse 100 from slipping against the surface on which it rests. Furthermore, the rubber caps 26a, 36a are connected to a screw shaft 26b, 36b which is received in a threaded hole 26c, 36c at the bottom of each foot 26, 36. The screw shaft 26b, 36b permits the adjustment of the distance that the caps 26a, 36a protrude from the feet 26, 36, thereby permitting the modification of the height of each individual leg 26, 36 of the doghouse 100, if necessary. The feet 26, 36 are connected to the bottom end of each leg 25, 35 using screws 26d, 36d or another type of fastener.

FIG. 16A is a top plan view of a first roof panel 70 of the doghouse 100; and FIG. 16B is a bottom plan view of the first roof panel 70. The first roof panel 70 is modified by providing notches 78 on the upper edge 72.

The runners 83 and reinforcing members 89 slide within the notches 78 to allow the second roof panel 80 to slide closer to the upper edge 72 of the first roof panel 70 without having to lift the upper edge 82 of the second roof panel 80 in the direction of arrow C (FIG. 10B).

FIG. 17 is a bottom plan view of a second roof panel 80 of the doghouse 100. The second roof panel 80 is modified by having the runners 83 with the same height as the runners 73 of the first roof panel 70.

To avoid interference between the upper edge 72 of the first roof panel 70 and the runners 83 and reinforcing members 89 of the second roof panel 80, the runners 83 and the reinforcing members 89 of the second roof panel 80 are received by the notches 78 in the upper edge 72 of the first roof panel 70. Thus, the runners 83 and the reinforcing members 89 on the interior side of the second roof panel 80 are allowed to slide within the notches 78 in the first roof panel 70.

Optionally, as shown in FIG. 17, the distance between the runner 83 and the reinforcing member 89 closer to the front panel 20 of the doghouse 100 can be longer than the distance between the runner 83 and the reinforcing member 89 closer to the rear panel 30 of the doghouse 100. Thus, the roof 3 of doghouse 100 hangs farther over the body 2 of the doghouse 100 more in the front than in the back of the doghouse 100.

The assembly of the doghouse 100 shown in FIGS. 14–20 will now be described.

FIG. 18A is a cross section showing the assembly of the first roof panel 70 of the doghouse 100; FIG. 18B is a cross section showing the assembly of the second roof panel 80 of the doghouse 100; FIG. 18C is a cross section of the assembly of the second roof panel 80 taken along line 18C—18C of FIG. 18B of the doghouse 100; FIG. 19 is a cross section taken along line 19—19 of FIG. 14 of the doghouse 100; and FIG. 20 is an enlarged cross section of the connection of the first roof panel 70 taken along line 20—20 of FIG. 19 of the doghouse 100.

The front panel 20, the rear panel 30, the side panels 40, the first floor panel 50, the second floor panel 60, and the first roof panel 70 are assembled to form the doghouse 100 shown in FIGS. 14–20, as described above with reference to the doghouse 1 shown in FIGS. 1–14.

The first roof panel 70 of the doghouse 100 slides along the direction shown by arrow A in FIG. 18A until the upper ends 75 of the tracks in the runners 73 abut the upper ends of the upper ledges 28, 38 of the front and the rear panels 20, 30, thereby preventing the first roof panel 70 from sliding any farther. Then, the second roof panel 80 of the doghouse 100 slides along the direction shown by arrow B in FIG. 18B until the upper ends 85 of the tracks 84 in the runners 83 abut the upper ends of the upper ledges 28, 38 of the front and the rear panels 20, 30, thereby preventing the second roof panel 80 from sliding farther.

Figure 18:
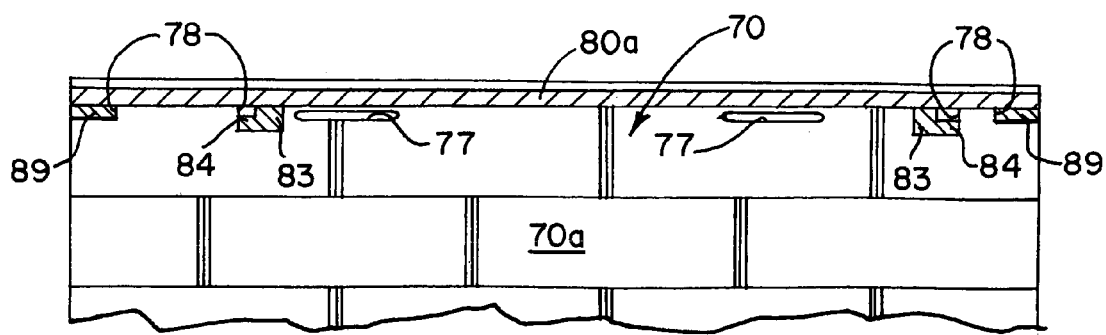
FIG. 18A is a cross section showing the assembly of the first roof panel of the doghouse of FIG. 14.
FIG. 18B is a cross section showing the assembly of the second roof panel of the doghouse of FIG. 14.
FIG. 18C is a cross section of the assembly of the second roof panel taken along line 18C—18C of the doghouse of FIG. 18B.
Figure 18:
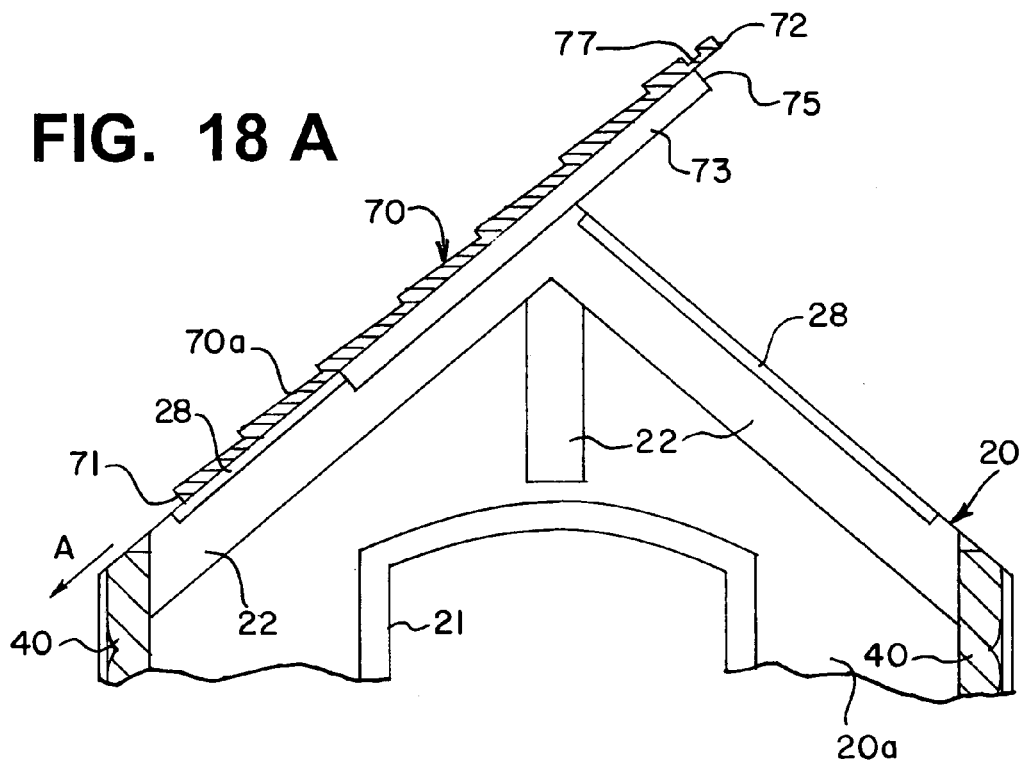
Figure 18:
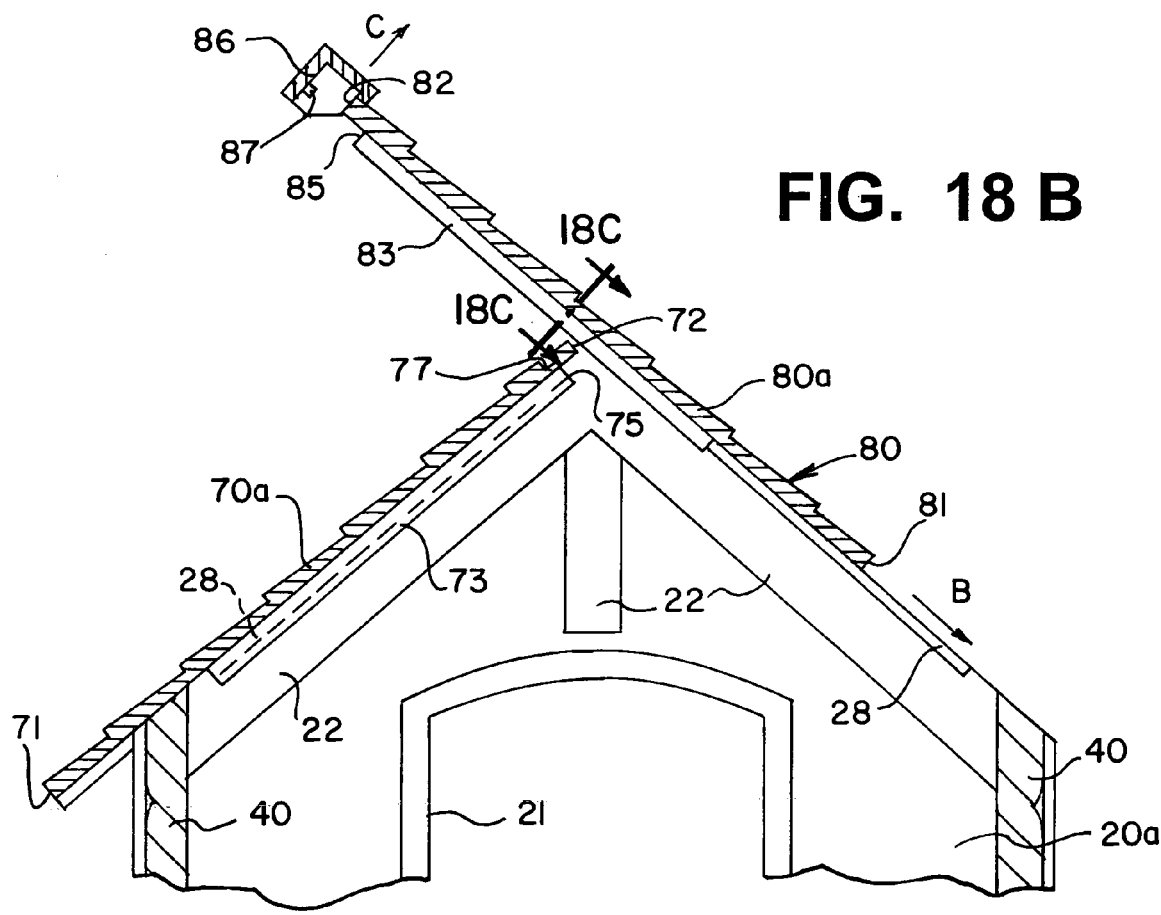

As shown in FIG. 18C, the runners 83 and the reinforcing members 89 slide within the notches 78 to allow the second roof panel 80 to slide close to the upper edge 72 of the first roof panel 70. The assembly of the doghouse 1 shown in FIGS. 1–13 is different than the assembly of the doghouse 100 shown in FIGS. 14–20, since the upper edge 82 of the second roof panel 80 of doghouse 100 is not pulled in the direction of arrow C. There is no significant gap between the track 84 in the runner 83 in the second roof panel 80 and the upper ledges 28, 38 of the front and rear panels 20, 30 of doghouse 100. The secure connection between the track 84 in the runner 83 and the upper ledges 28 of the front panel 20 of doghouse 100 is shown in FIG. 20. Likewise, there is no significant gap between the track 84 in the second roof panel 80 and the upper ledge 38 of the rear panel 30.

The tongue members 87 in the capping 86 of the second roof panel 80 are inserted into the slots 77 on the first roof panel 70, as shown in FIG. 19, to complete the assembly of the doghouse 100.

FIGS. 21–24 illustrate another embodiment of a doghouse 200 according to yet another embodiment of the present invention. The doghouse 200 includes a front panel 220, a rear panel 230, side panels 240, a single floor panel 250, a first roof panel 270, and a second roof panel 280. Legs 210 connect each of the side panels 240 to the front panel 220 and the rear panel 230. A hinge 290 (FIGS. 22 and 23) connects the first roof panel 270 to the second roof panel 280.

Figure 21:
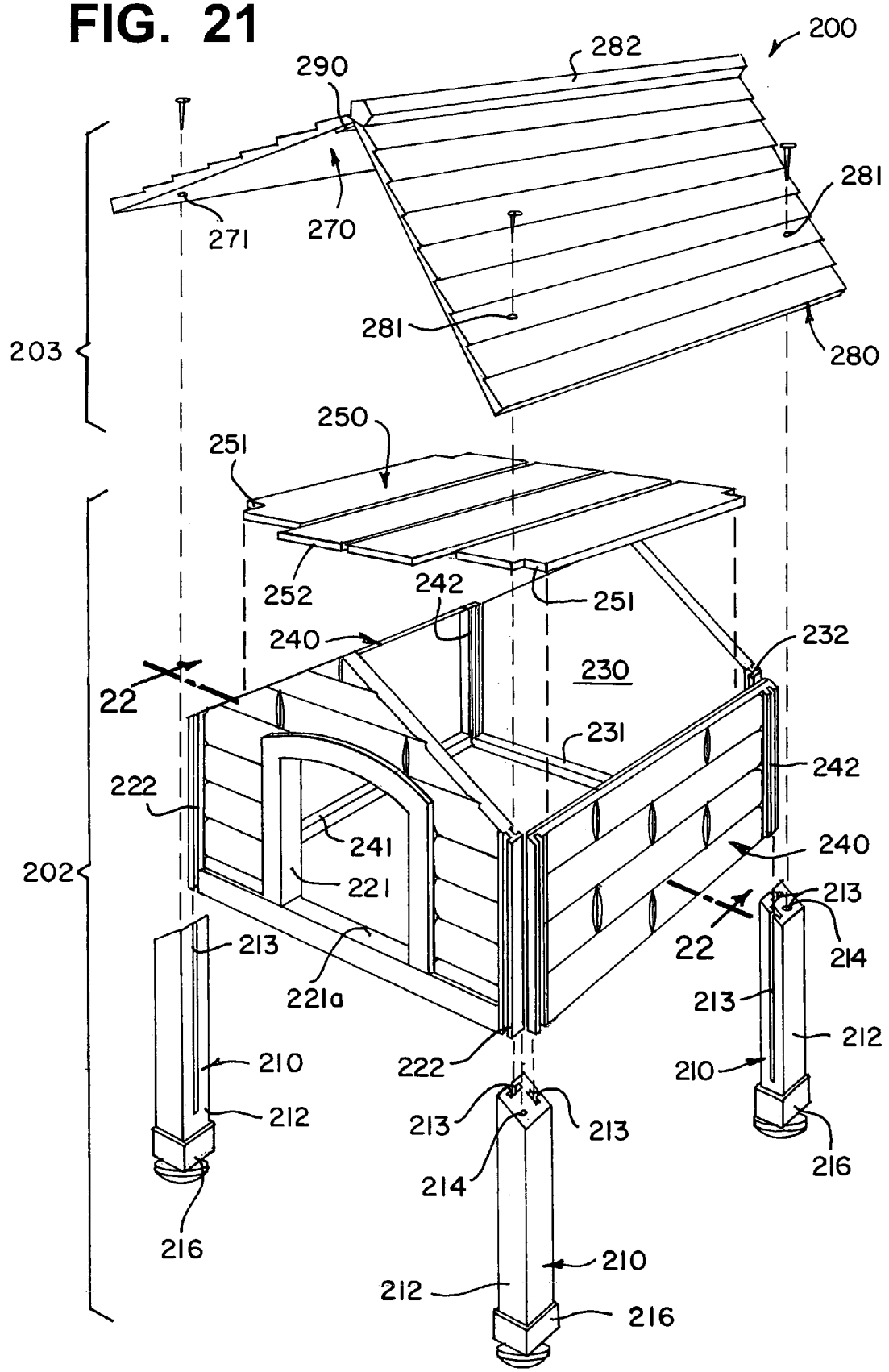
FIG. 21 is an exploded perspective view of an assembled doghouse, according to a further embodiment of the present invention.

FIG. 21 is an exploded perspective view of the assembled doghouse 200. The doghouse 200 includes a body 202 supporting a roof 203. The body 202 includes the legs 210, the front panel 220, the rear panel 230, the side panels 240, and the floor panel 250. The roof 203 includes the first roof panel 270, the second roof panel 280, and the hinge 290. According to the present embodiment of the invention, the roof 203 is shaped in an inverted V-shape that extends from the front panel 220 to the rear panel 230. The roof 203 also forms eaves by extending forward past the front panel 220 and rearward past the rear panel 230.

Each of the legs 210 includes a connecting portion 212 with a top end that abuts the roof 203 and a bottom end connected to a foot 216, which is substantially identical to the foot 26, 36 described above in connection with the embodiment of the invention shown in FIGS. 14–20.

The connecting portions 212 are provided at each corner of the doghouse 200 to connect the front panel 220, the rear panel 230, and the side panels 240. Each of the connecting portions 212 includes two female tee grooves 213 that extend longitudinally along two adjacent sides thereof. The grooves 213 are open at the top end of the connection portion 212 and extend longitudinally along the connecting portion 212 as far as the adjoining panels are to be inserted into the leg 210, preferably close to the feet 216. The grooves 213 mate with corresponding tee extrusions on the adjoining panels.

The top end of the connecting portion 212 is formed at an angle with respect to the bottom end to closely support the angled surface of the V-shaped roof 203. A threaded hole 214 is provided on the top end of the connecting portion 212 for mounting the roof 203 to the body 202 of the doghouse 200.

The front panel 220 includes a doorway 221 similar to the doorway 21 provided in the embodiments of the doghouses 1, 100 shown in FIGS. 1–20. The foot 221a of the doorway 221 supports the floor panel 250. The front panel 220 also includes male tee extrusions 222 extending along the length of the sides thereof. The male tee extrusions 222 allow the front panel 220 to slide into the female tee grooves 213 in the legs 212 to join the front panel 220 to the adjoining legs 212.

The rear panel 230 includes a lower ledge 231 on the interior side thereof for supporting the floor panel 250. The rear panel 230 also includes male tee extrusions 232 extending along the length of the sides thereof. The male tee extrusions 232 allow the rear panel 230 to slide into the female tee grooves 213 in the legs 212 to join the rear panel 230 to the adjoining legs 212.

The side panels 240 each include a lower ledge 241 on the interior side thereof for supporting the floor panel 250. Each of the side panels 240 also includes male tee extrusions 242 on the two sides thereof. The male tee extrusions 242 allow the side panel 240 to slide into the female tee grooves 213 in the legs 212 to join the side panel 240 to the adjoining legs 212.

Alternatively, the tee joints described above may be replaced with any other type of sliding joint. For example, the tee grooves 213 and tee extrusions 222, 232, 242 described above can be replaced by dovetail grooves and extrusions for creating dovetail joints which can slidably interlock together.

Preferably, the floor panel 250 includes notches 251 that are cut into each corner of the floor panel 250 so that the outline of the notches 251 generally match the outline of the legs 210 connecting the front panel 220, the rear panel 230, and the side panels 240. Therefore, similar to the notches 51, 61 provided on the first and the second floor panels 50, 60 of the doghouses 1, 100 described above and shown in FIGS. 1–20, the notches 251 allow the floor panel 250 to provide wall-to-wall flooring for the doghouse 200.

The floor panel 250 also includes a lip 252 that extends over the foot 221a of the door 221 of the front panel 220 so that the floor panel 250 can be supported by the front panel 220. The floor panel 250 is also supported by the lower ledges 231, 241 of the rear panel 230 and the side panels 240.

The hinge 290 extends along the apex of the inverted V-shaped roof 203 and connects the first roof panel 270 to the second roof panel 280. Thus, the roof 203 of the doghouse 200 can be stored or transported in a flat condition by folding the roof panels 270, 280 together via the hinge 290. The hinge 290 is fastened to the interior surfaces along the adjacent edges of the roof panels 270, 280.

A pair of alignment blocks 273 are provided on the interior surface of the first roof panel 270 for positioning the first roof panel 270 with respect to the adjacent side panel 240. A pair of alignment blocks 283 are provided on the interior surface of the second roof panel 280 for positioning the second roof panel 280 with respect to the adjacent side panel 240. When the roof 203 is positioned on the body 202 of the doghouse 200, the alignment blocks 273, 283 abut against the interior surfaces of the respective side panels 240.

Similar to the doghouses 1, 100 described above and shown in FIGS. 1–20, the second roof panel 280 includes an inverted V-shaped capping 282. The capping 282 covers the hinge 290 and is permanently fastened to the upper edge of the second roof panel 280 using an adhesive, for example. The capping 282 prevents outside elements, e.g., rain, dirt, and other debris, from falling into the doghouse 200 through any gaps in the hinge 290.

The first and the second roof panels 270, 280 also include mounting holes 271, 281 for mounting the roof panels 270, 280 to the body 202 of the doghouse 200. Screws are inserted through the mounting holes 271, 281 in the roof panels 270, 280 and connected to the threaded holes 214 at the top ends of each of the legs 210.

The assembly of the doghouse 200 shown in FIGS. 21–24 will now be described.

Figure 22:
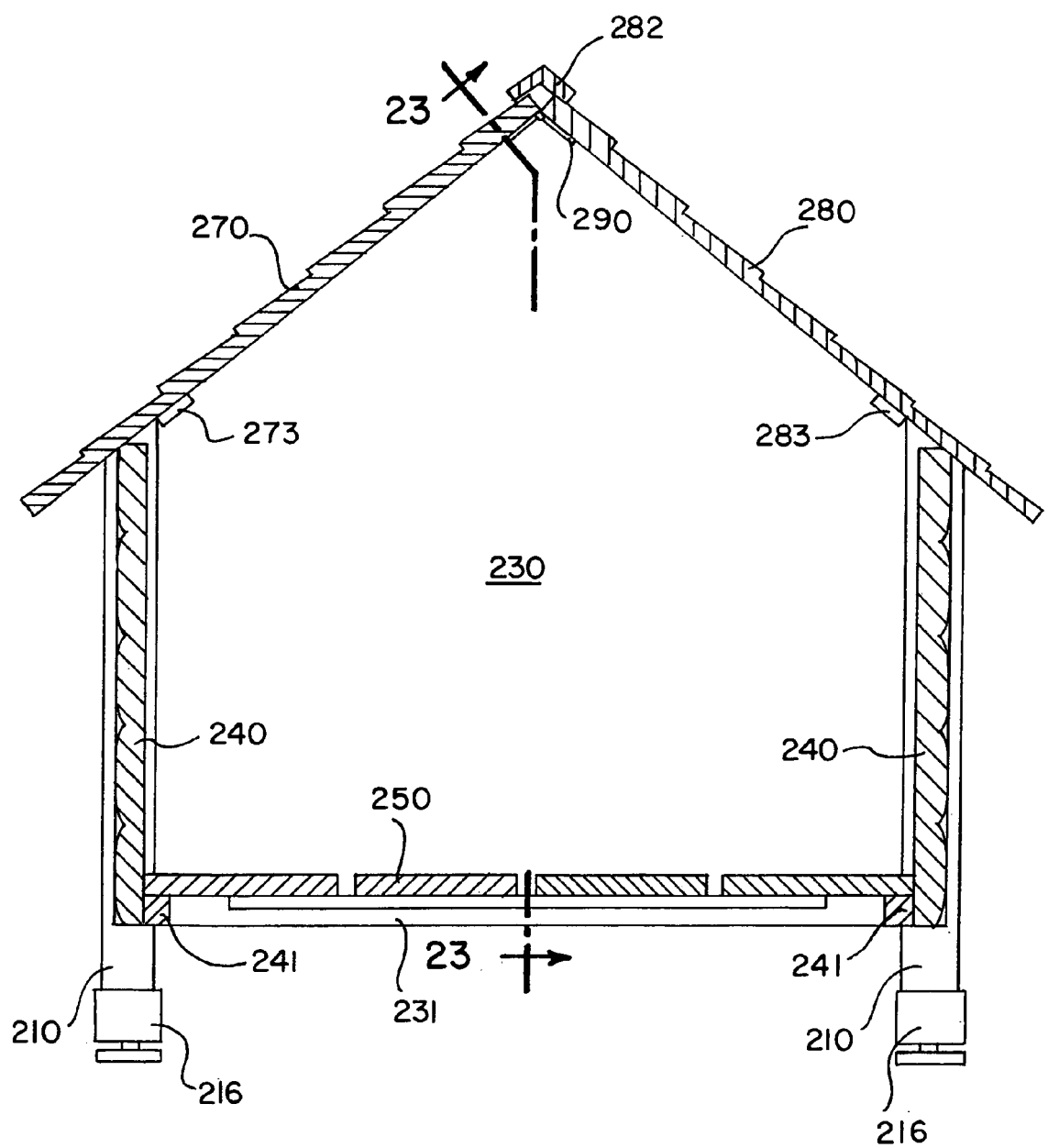
FIG. 22 is a cross section of the assembly of the doghouse taken along line 22—22 of FIG. 21.
Figure 23:
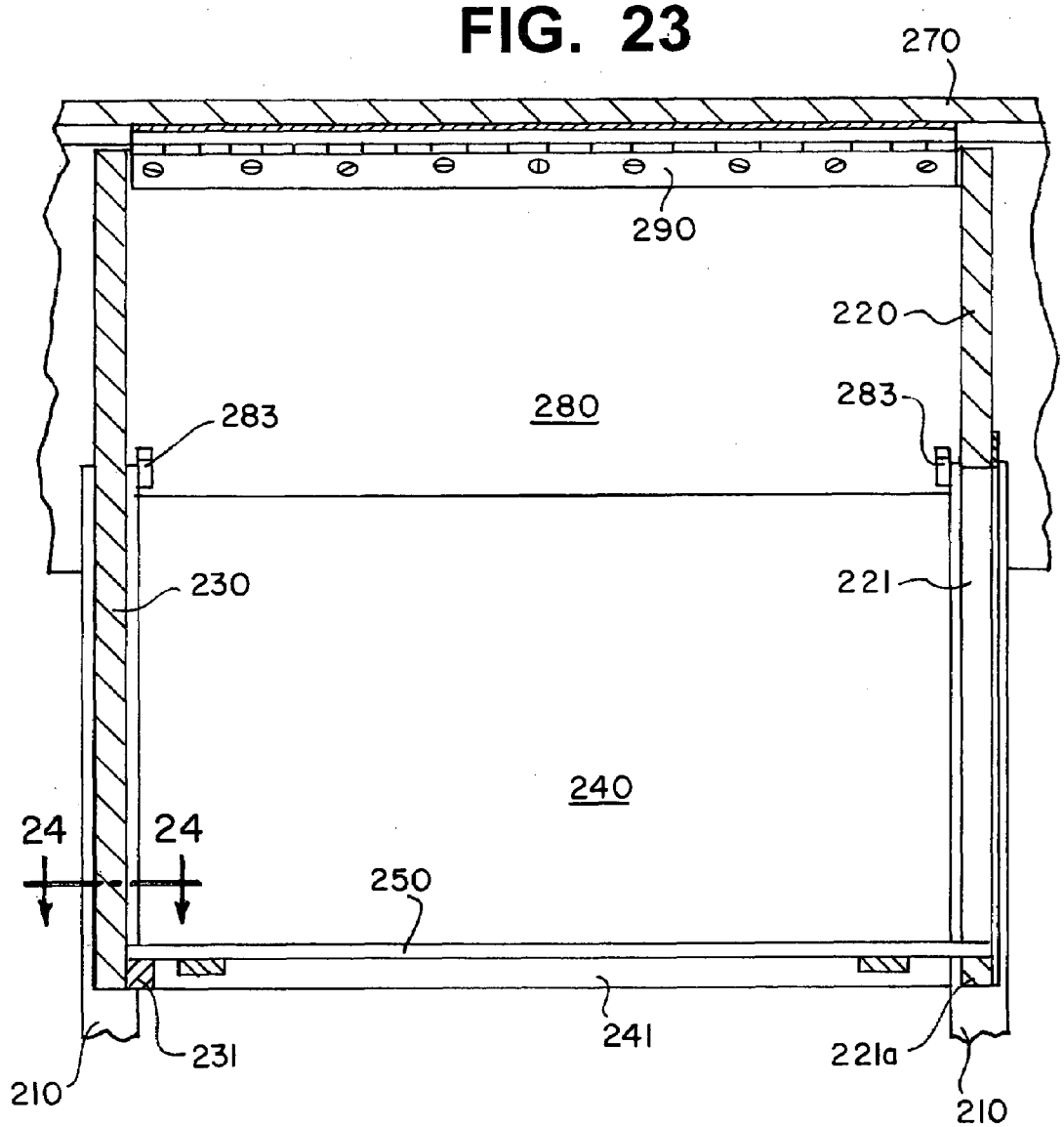
FIG. 23 is a cross section of the assembly of the doghouse taken along line 23—23 of FIG. 22.
Figure 24:
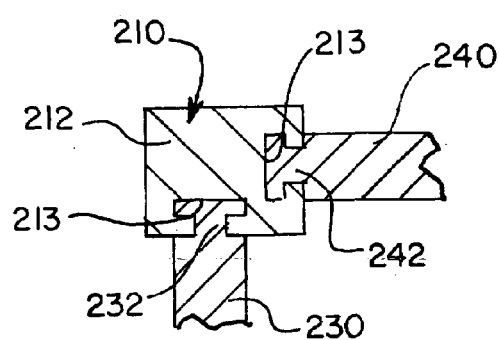
FIG. 24 is an enlarged cross section of a leg of the doghouse taken along line 24—24 of FIG. 23.

FIG. 22 is a cross section of the assembled doghouse 200 taken along line 22—22 of FIG. 21; FIG. 23 is a cross section of the assembled doghouse 200 taken along line 23—23 of FIG. 22; and FIG. 24 is an enlarged cross section of the leg 210 of the doghouse 200 taken along line 24—24 of FIG. 23.

The doghouse 200 is assembled by sliding the tee extrusions 222, 232, 242 of the front panel 220, the rear panel 230, and the side panels 240 into the tee grooves 213 of the legs 210. The connection between the legs 210 and the rear panel 230 and side panel 240 is shown in FIG. 24. There is a separate leg 210 that connects the front panel 220 to the left side panel 240, the left side panel 240 to the rear panel 230, the rear panel 230 to the right side panel 240, and the right side panel 240 to the front panel 220.

Then, the floor panel 250 is lowered into the structure formed by the legs 210, the front panel 220, the rear panel 230, and the side panels 240 so that the lip 252 of the floor panel 250 rests on the foot 221a of the doorway 221 and the other sides of the floor panel 250 are supported by the lower ledges 231, 241 of the rear panel 230 and side panels 240.

Finally, the roof 203 is positioned so that the hinge is in an open position and the roof panels 270, 280 are spread to form an inverted V-shape. The roof 203 is then lowered over the body 202 of the doghouse 200 so that the mounting holes 271, 281 in the first and second roof panels 270, 280 are aligned with the threaded holes 214 in the legs 210 and the alignment blocks 273, 283 abut against the interior surfaces of the respective side panels 240. Finally, screws are used to fasten the roof 203 to the body 202 of the doghouse 200.

In an alternative embodiment of the present invention, the roof 203 of the doghouse 200 shown in FIGS. 21–24 can be screwed onto base 2 of the doghouses 1, 100 shown in FIGS. 1–20 via mounting holes (not shown) in the legs 25, 35 of the front panel 20 and the rear panel 302 of the doghouses 1, 100 shown in FIGS. 1–20.

In another alternative embodiment of the present invention, the front panel 220 and the rear panel 230 of the doghouse 200 shown in FIGS. 21–24 can include upper ledges like those included in the doghouses 1, 100 shown in FIGS. 1–20 for sliding the roof 3 of doghouses 1, 100 onto the base 202 of doghouse 200.

Advantages

The advantages of the doghouse 1, 100, 200 of the present invention will now be described.

Since the panels of the doghouse 1, 100, 200 are prefabricated, the doghouse 1, 100, 200 can be assembled and disassembled efficiently by following a series of easy-to-follow steps. A user can purchase the doghouse 1, 100, 200 in a disassembled condition, transport the disassembled doghouse 1, 100, 200, and can easily assemble the doghouse 1, 100, 200 at home with a minimal amount of time and effort. Assembling the doghouse either requires a screwdriver (for doghouse 200) or no tools at all (for doghouses 1 and 100).

It is preferable to provide a doghouse that requires fewer fasteners such as screws, if necessary, since the fasteners may be displaced during transport or in storage. Since the doghouse cannot be reassembled without all of the fasteners, the user must find replacement fasteners or purchase a replacement doghouse.

The exterior surfaces of the front panel 20, 220, the rear panel 30, 230, the side panels 40, 240, and the roof panels 70, 80, 270, 280 may be formed to resemble a house, e.g., having shingles on the roof and siding, to provide an attractive appearance. Furthermore, the panels can be covered with a weatherproofing layer to prevent deterioration and damage due to the outside environment.

The inverted V-shaped capping 86, 282 overlaps the upper edge 72 of the first roof panel 70, 270. Therefore, water and other outside elements cannot enter into the doghouse 1, 100, 200 through the opening between the first roof panel 70, 270 and the second roof panel 80, 280. Since eaves are formed by the roof 3, 203 overlapping the body 2, 202 of the doghouse 1, 100, 200, outside elements are prevented from entering between the roof 3, 203 and the body 2, 202. Furthermore, the panels in the body 2, 202 of the doghouse 1, 100, 200 are connected securely and closely to prevent outside elements from entering through the body 2, 202.

Since the doghouse 1, 100, 200 can be disassembled into generally flat panels, the doghouse 1, 100, 200 can be stored and transported without occupying a large amount of space.

Since the doghouse 1, 100, 200 can be assembled without any permanent (non-removable) fasteners, e.g., nails or glue, the doghouse 1, 100, 200 can be disassembled, stored, and then reused multiple times over the lifetime of the doghouse 1, 100, 200.

Since the connecting sections for connecting the panels of the doghouse 1, 100, 200, are sturdy, the doghouse 1, 100, 200 is more reliable and durable. It is less likely that one of the connecting portions of the doghouse 1, 100, 200 will break. Therefore, the panels of the doghouse 1, 100, 200 are prevented from unintentionally breaking apart. The hooks 43 in the side panels 40 of the doghouses 1, 100 shown in FIGS. 1–20 are securely retained within the slots 23, 33 in the front panel 20 and the rear panel 30. The roof panels 60, 70 slide securely onto the front panel 20 and the rear panel 30 and are held securely to the body 2 of the doghouse 1 by their own weight. Furthermore, the floor panels 50, 60 are supported by the lower ledges 27, 37 of the front panel 20 and the rear panel 30 and are held in place by the weight of the floor panels 50, 60 and by the weight of anything that is supported thereon.

Furthermore, the tee extrusions 222, 232, 242 between the legs 120 and the front panel 220, the rear panel 230, and the side panels 240 of the doghouse 200 shown in FIGS. 21–24 are securely retained within the tee grooves 213 in the legs 210. The roof panels 260, 270 are held securely to the body 2 of the doghouse 1 by screws. Furthermore, the floor panel 250 is supported by the foot 221*a* of the door 221 and by the lower ledges 231, 241 of the rear panel 230 and the side panels 240. The floor panel 250 is held in place by the weight of the panel and by the weight of anything that is supported on the panel.

There are no exposed fasteners in the doghouses 1, 100 shown in FIGS. 1–20 and few exposed fasteners in the doghouse 200 shown in FIGS. 21–24. Thus, the doghouse 1, 100, 200 has an appealing appearance and is more durable since exposed fasteners are more likely to scratch or catch on clothing or skin, for example, thereby risking being pulled out or damaging the other object.

Having described embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A doghouse comprising:
   a plurality of side panels;
   a front panel and a rear panel, each including at least one upper ledge;
   hook and slot means for connecting said front panel, said rear panel, and said plurality of side panels to form a rectangular base structure; a plurality of slots extending partially through an interior surface of at least one of said front panel, said rear panel, and said plurality of side panels; a plurality of hooks extending from at least one of said rear panel, said front panel, and said plurality of side panels, that slide into said slots and connect to receiving members in said slots;
   a first roof panel and a second roof panel, each roof panel including at least one L-shaped runner attached to an interior surface of each roof panel that slidably connects to the upper ledge of at least one of said front panel and said rear panel, the second roof panel including a capping that covers a gap formed between said first roof panel and said second roof panel, and
   one of said first roof panel and said capping includes at least one slot and the other includes a tongue that engages with said at least one slot to interlock the first and second roof panels.

2. The doghouse of claim 1, wherein:
   said front panel and said rear panel each comprise a plurality of slots, each slot extending partially through an interior surface, and
   each of said plurality of side panels comprise a plurality of hooks that slide into said slots in said front panel and said rear panel.

3. The doghouse of claim 1, wherein
   each of said plurality of side panels comprise a plurality of slots, each slot extending partially through an interior surface, and
   said front panel and said rear panel each comprise a plurality of hooks that slide into said slots in said plurality of side panels.

4. The doghouse of claim 1, further comprising a plurality of feet and a plurality of legs, at least one foot adjustably coupled to each of said plurality of legs such that the height of the doghouse can be adjusted.

5. The doghouse of claim 1, wherein said first roof panel and said second roof panel each comprising a pair of runners.

6. The doghouse of claim 5, wherein the front panel and the rear panel each comprise a pair of upper ledges against which one of the runners of each of the first and second roof panel slidably engages.

7. The doghouse of claim 5, wherein said runners of said second roof panel are taller than said runners of said first roof panel.

8. The doghouse of claim 1, wherein notches are cut into said first roof panel to allow said runners of said second roof panel to slide through said notches.

9. The doghouse of claim 1, wherein said first roof panel and said second roof panel connected by a hinge, and said first roof panel and said second roof panel are fastened to the front panel and the rear panel.

10. The doghouse of claim 1, wherein said front panel, said side panels, said rear panel, and said first and second roof panels are connected to each other without using permanent fasteners.

11. The doghouse of claim 1 further comprising:
    two front legs and two rear legs,
    wherein said hook and slot means connects said front panel to the two front legs and each of said front legs to at least one side panel, and
    said hook and slot means connects said rear panel to the two rear legs and each of said two rear legs to at least one side panel.

12. The doghouse of claim 11, wherein:
    the front panel, said plurality of side panels, and the rear panel each comprise a plurality of slots, each slot extending partially through an interior surface of said front panel, said rear panel, and said plurality of side panels, and
    each of said legs comprise a plurality of hooks that slide into said slots in said front panel, said rear panel, and said plurality of side panels.

13. The doghouse of claim 11, wherein said L-shaped runners of said second roof panel are taller than said runners of said first roof panel.

14. The doghouse of claim 11, wherein:
    each of said legs comprise a plurality of slots extending partially through an interior surface of said legs; and
    each of said side panels, said front panel, and said rear panel each comprise a plurality of hooks that slide into said slots in said plurality of legs.

15. The doghouse of claim 11, further comprising a plurality of grooves extending partially through an interior surface of said front panel and said rear panel wherein said side panels comprise a plurality of extrusions that slide into said grooves in said front panel and said rear panel to form an interlocking connection so that the side panels, the front panel, and the rear panel form a base of a doghouse.

16. The doghouse of claim 15, wherein at least one pair of the groove and the extrusion forms one joint of the group consisting of a tee-shaped joint and a dovetail joint.

17. The doghouse of claim 11, wherein said front panel, said side panels, said legs, said rear panel, said first roof panel, and said second roof panel are connected to each other without using permanent fasteners.

18. The doghouse of claim 1, wherein the L-shaped runners of the first and second roof panel have closed upper ends which limit the engagement of the runners and the upper ledges.

19. A method for assembling a doghouse comprising a front and rear panel, a plurality of side panels, a first roof panel, and a second roof panel including a capping, said method comprising the steps of:
- sliding a plurality of hooks, said hooks extending from one of said plurality of side panels, and said front and rear panel, into slots extending partially through an interior surface of the other of said side panels, and said front and rear panel;
- connecting said hooks to respective receiving members in said slots to form a rectangular base,
- sliding a first roof panel onto a front panel and a rear panel by interlocking a plurality of L-shaped runners attached to an interior surface of said first roof panel with at least one first upper ledge on said front panel and at least one first upper ledge on said rear panel;
- sliding a second roof panel onto said front panel and said rear panel by interlocking a plurality of L-shaped runners attached to an interior surface of said second roof panel with at least one second upper ledge on said front panel and at least one upper ledge on said rear panel; and
- connecting said first roof panel with said second panel by interlocking one or more members of said capping with one or more slots of said first roof panel.

20. The method of claim 19, further comprising the step of slidably connecting a plurality of legs to the at least two side panels, a front panel, and a rear panel by slidably connecting a pair of grooves extending partially through each of the legs onto each of a plurality of extrusions on said side panels, said front panel, and said rear panel.

21. The method of claim 19, further comprising the steps of:
- slidably connecting a first leg to a front panel and to one side panel so that grooves in said first leg connect with first extrusions in said front panel and said one side panel;
- slidably connecting a second leg to said front panel and to another side panel so that grooves in said second leg connect with second extrusions in said front panel and said other side panel;
- slidably connecting a third leg to a rear panel and to said one side panel so that grooves in said third leg connect with third extrusions in said rear panel and said one side panel; and
- slidably connecting a fourth leg to said rear panel and to said other side panel so that grooves in said fourth leg connect with fourth extrusions in said rear panel and said other side panel.

* * * * *